US011013315B2

(12) United States Patent
Wagner et al.

(10) Patent No.: US 11,013,315 B2
(45) Date of Patent: May 25, 2021

(54) LIGHT DIFFUSER FOR ORAL CLEANSING DEVICES

(71) Applicant: WATER PIK, INC., Fort Collins, CO (US)

(72) Inventors: Robert D. Wagner, Firestone, CO (US); Brian J. Woodard, Boulder, CO (US)

(73) Assignee: WATER PIK, INC., Fort Collins, CO (US)

( * ) Notice: Subject to any disclaimer, the term of this patent is extended or adjusted under 35 U.S.C. 154(b) by 0 days.

(21) Appl. No.: 16/814,809

(22) Filed: Mar. 10, 2020

(65) Prior Publication Data
US 2020/0205561 A1 Jul. 2, 2020

Related U.S. Application Data

(63) Continuation of application No. 15/843,245, filed on Dec. 15, 2017, now Pat. No. 10,610,008.
(Continued)

(51) Int. Cl.
*F21V 33/00* (2006.01)
*A46B 15/00* (2006.01)
(Continued)

(52) U.S. Cl.
CPC ............ *A46B 15/0044* (2013.01); *A46B 9/04* (2013.01); *A61C 1/088* (2013.01); *A61C 17/0202* (2013.01); *A61C 17/22* (2013.01); *A61C 17/221* (2013.01); *A61C 17/225* (2013.01); *A61C 17/34* (2013.01); *F21L 4/02* (2013.01); *F21L 4/08* (2013.01); *F21V 7/10* (2013.01);
(Continued)

(58) Field of Classification Search
CPC ....... H05B 47/16; F21V 7/04; A46B 15/0044; A46B 9/04
USPC .......................................................... 362/96
See application file for complete search history.

(56) References Cited

U.S. PATENT DOCUMENTS 669,402 A 3/1901 Rose
684,951 A 10/1901 Rothkranz
(Continued)

FOREIGN PATENT DOCUMENTS

CH 435553 10/1967
CH 609238 2/1979
(Continued)

OTHER PUBLICATIONS

Sonex International: Brushing with the Ultima—The World's Only Dual-Frequency Ultrasonic Toothbrush, Jul. 28, 1999, published at Sonipic.com.
(Continued)

*Primary Examiner* — Ahshik Kim
(74) *Attorney, Agent, or Firm* — Dorsey & Whitney LLP

(57) ABSTRACT

The present disclosure relates to an oral cleansing device with illumination features. In one example, a diffuser for diffusing light is disclosed. The diffuser includes a first membrane configured to be positioned over a first light source, a second membrane coupled to the first membrane and configured to be positioned over a second light source; and a bridge coupling the first membrane to the second membrane, where the bridge extends from an edge of the first membrane to an edge of the second membrane in an indirect manner.

19 Claims, 8 Drawing Sheets

Related U.S. Application Data

(60) Provisional application No. 62/435,053, filed on Dec. 15, 2016.

(51) Int. Cl.

| | | |
|---|---|---|
| *H05B 47/16* | (2020.01) | |
| *A46B 9/04* | (2006.01) | |
| *A61C 1/08* | (2006.01) | |
| *A61C 17/02* | (2006.01) | |
| *A61C 17/22* | (2006.01) | |
| *A61C 17/34* | (2006.01) | |
| *F21L 4/02* | (2006.01) | |
| *F21L 4/08* | (2006.01) | |
| *F21V 7/10* | (2006.01) | |
| *F21V 11/00* | (2015.01) | |
| *F21V 23/04* | (2006.01) | |
| *F21Y 105/18* | (2016.01) | |
| *F21Y 115/10* | (2016.01) | |

(52) U.S. Cl.
CPC .......... *F21V 11/00* (2013.01); *F21V 23/0471* (2013.01); *F21V 33/0064* (2013.01); *H05B 47/16* (2020.01); *F21Y 2105/18* (2016.08); *F21Y 2115/10* (2016.08)

(56) References Cited

U.S. PATENT DOCUMENTS

| | | |
|---|---|---|
| 914,501 A | 3/1909 | McEachern |
| 933,718 A | 9/1909 | Mahoney |
| 958,371 A | 5/1910 | Danek |
| 1,018,927 A | 2/1912 | Sarrazin |
| 1,033,819 A | 7/1912 | McMann |
| 1,059,426 A | 4/1913 | Barnes |
| D45,199 S | 2/1914 | McDonagh et al. |
| D45,572 S | 4/1914 | Sarrazin |
| 1,128,139 A | 2/1915 | Hoffman |
| D49,472 S | 8/1916 | Dierke |
| 1,251,250 A | 12/1917 | Libby |
| 1,268,544 A | 6/1918 | Cates |
| 1,278,225 A | 9/1918 | Schamberg |
| 1,296,067 A | 3/1919 | Fuller |
| D53,453 S | 7/1919 | Lloyd |
| 1,313,490 A | 8/1919 | Larson |
| 1,337,173 A | 4/1920 | White |
| 1,355,037 A | 10/1920 | Dziuk |
| D57,327 S | 3/1921 | Gibson |
| 1,382,681 A | 6/1921 | Segal |
| 1,424,879 A | 8/1922 | Carlstedt |
| 1,440,785 A | 1/1923 | Levis |
| 1,456,535 A | 5/1923 | Cartwright |
| 1,488,214 A | 3/1924 | Mason |
| 1,494,448 A | 5/1924 | Sookne |
| 1,497,495 A | 6/1924 | Fincke |
| 1,517,320 A | 12/1924 | Stoddart |
| 1,527,853 A | 2/1925 | Ferdon |
| 1,588,785 A | 6/1926 | Van Sant |
| 1,639,880 A | 8/1927 | Butler |
| 1,657,450 A | 1/1928 | Barnes |
| 1,676,703 A | 7/1928 | Nuyts |
| 1,696,835 A | 12/1928 | Burnett |
| 1,703,642 A | 2/1929 | Sticht |
| 1,794,711 A | 3/1931 | Jacobs |
| 1,796,641 A | 3/1931 | Zimmerman et al. |
| 1,800,993 A | 4/1931 | Funk |
| 1,832,519 A | 11/1931 | Wheat et al. |
| 1,880,617 A | 10/1932 | White |
| 1,916,641 A | 7/1933 | Seeliger |
| 1,927,365 A | 9/1933 | Frolio |
| 1,943,225 A | 1/1934 | McIntyre |
| 1,992,770 A | 2/1935 | Rathbun |
| 2,016,597 A | 10/1935 | Drake |
| 2,016,644 A | 10/1935 | Luball |
| 2,042,239 A | 5/1936 | Planding |
| 2,044,863 A | 6/1936 | Sticht |
| D101,080 S | 9/1936 | Cosad |
| 2,114,947 A | 4/1938 | Warsaw |
| D113,743 S | 3/1939 | Kahn |
| D113,744 S | 3/1939 | Kahn |
| 2,158,738 A | 5/1939 | Baker et al. |
| 2,168,964 A | 8/1939 | Strasser |
| 2,206,726 A | 7/1940 | Lasater |
| 2,209,173 A | 7/1940 | Russell |
| 2,218,072 A | 10/1940 | Runnels |
| 2,226,663 A | 12/1940 | Hill et al. |
| 2,244,098 A | 6/1941 | Busick |
| 2,246,523 A | 6/1941 | Kulik |
| 2,273,717 A | 2/1942 | Millard et al. |
| 2,278,365 A | 3/1942 | Daniels |
| 2,279,355 A | 4/1942 | Wilensky |
| 2,282,700 A | 5/1942 | Bobbroff |
| 2,312,828 A | 3/1943 | Adamsson |
| D136,156 S | 8/1943 | Fuller |
| D139,532 S | 11/1944 | Trecek |
| D141,350 S | 5/1945 | Alexander et al. |
| D144,163 S | 3/1946 | Dolnick |
| 2,401,186 A | 5/1946 | Price |
| 2,405,029 A | 7/1946 | Gallanty et al. |
| D146,271 S | 1/1947 | Stavely |
| 2,414,775 A | 1/1947 | Stavely |
| 2,429,740 A | 10/1947 | Aufsesser |
| 2,450,635 A | 10/1948 | Dembenski |
| D154,598 S | 7/1949 | Gass |
| D155,668 S | 10/1949 | Zandberg et al. |
| D157,669 S | 3/1950 | Graves, Jr. |
| D160,101 S | 9/1950 | MacDonald |
| 2,533,345 A | 12/1950 | Bennett |
| 2,543,999 A | 3/1951 | Voss |
| D163,707 S | 6/1951 | Pifer |
| 2,558,332 A | 6/1951 | Artale |
| 2,567,080 A | 9/1951 | Pifer |
| 2,577,597 A | 12/1951 | Wright et al. |
| 2,583,750 A | 1/1952 | Runnels |
| 2,598,275 A | 5/1952 | Lakin |
| 2,618,003 A | 11/1952 | Robey |
| D169,131 S | 3/1953 | Fay |
| 2,651,068 A | 9/1953 | Seko |
| D170,680 S | 10/1953 | Del Mas |
| D172,693 S | 7/1954 | Wibbelsman et al. |
| D173,616 S | 12/1954 | Hernandez |
| 2,705,335 A | 4/1955 | Glassman et al. |
| 2,709,227 A | 5/1955 | Foley et al. |
| 2,722,703 A | 11/1955 | Green |
| 2,728,928 A | 1/1956 | Beeren |
| 2,734,139 A | 2/1956 | Murphy |
| 2,806,235 A | 9/1957 | Carstairs et al. |
| 2,819,482 A | 1/1958 | Applegate |
| 2,868,215 A | 1/1959 | Mechem |
| 2,875,458 A | 3/1959 | Tsuda |
| 2,917,758 A | 12/1959 | Held et al. |
| 2,931,371 A | 4/1960 | Petitta |
| 2,946,072 A | 7/1960 | Filler et al. |
| 2,962,033 A | 11/1960 | Lew |
| 2,977,614 A | 4/1961 | Demanuele |
| 2,977,682 A | 4/1961 | Flatray |
| 3,103,027 A | 9/1963 | Birch |
| 3,104,405 A | 9/1963 | Perrinjaquet |
| 3,106,216 A | 10/1963 | Kirby |
| D197,048 S | 12/1963 | Troy |
| D197,208 S | 12/1963 | Cassidy et al. |
| 3,143,697 A | 8/1964 | Springer |
| 3,145,404 A | 8/1964 | Fiedler |
| D199,560 S | 11/1964 | Thompson |
| D199,893 S | 12/1964 | Bond et al. |
| 3,159,859 A | 12/1964 | Rasmussen |
| 3,160,902 A | 12/1964 | Aymar |
| 3,168,834 A | 2/1965 | Smithson |
| 3,181,189 A | 5/1965 | Leyden |
| 3,183,538 A | 5/1965 | Hubner |
| 3,195,537 A | 7/1965 | Blasi |
| D202,873 S | 11/1965 | Husted |
| 3,220,039 A | 11/1965 | Dayton et al. |

(56) References Cited

U.S. PATENT DOCUMENTS

| | | |
|---|---|---|
| 3,229,318 A | 1/1966 | Clemens |
| 3,230,562 A | 1/1966 | Birch |
| D204,127 S | 3/1966 | Syvertson |
| 3,258,805 A | 7/1966 | Rossnan |
| 3,270,416 A | 9/1966 | Massa |
| 3,278,963 A | 10/1966 | Bond |
| 3,289,681 A | 12/1966 | Chambers |
| 3,311,116 A | 3/1967 | Foster |
| 3,316,576 A | 5/1967 | Urbrush |
| 3,335,443 A | 8/1967 | Parisi et al. |
| 3,346,748 A | 10/1967 | McNair |
| 3,358,309 A | 12/1967 | Richardson |
| 3,358,314 A | 12/1967 | Matibag |
| 3,359,588 A | 12/1967 | Kobler |
| 3,364,576 A | 1/1968 | Kern, Jr. |
| D210,066 S | 2/1968 | Johnson |
| 3,369,265 A | 2/1968 | Halberstadt et al. |
| 3,371,260 A | 2/1968 | Jackson et al. |
| D210,349 S | 3/1968 | Boldt |
| 3,375,820 A | 4/1968 | Kuris et al. |
| 3,394,277 A | 7/1968 | Satkunas et al. |
| D212,208 S | 9/1968 | Rogers |
| 3,418,552 A | 12/1968 | Holmes |
| 3,421,524 A | 1/1969 | Waters |
| 3,430,279 A | 3/1969 | Hintze |
| 3,463,994 A | 8/1969 | Spohr |
| 3,466,689 A | 9/1969 | Aurelio et al. |
| 3,472,045 A | 10/1969 | Nelsen et al. |
| 3,472,247 A | 10/1969 | Borsum et al. |
| 3,474,799 A | 10/1969 | Cappello |
| 3,509,874 A | 5/1970 | Stillman |
| 3,535,726 A | 10/1970 | Sawyer |
| 3,536,065 A | 10/1970 | Moret |
| 3,538,359 A | 11/1970 | Barowski |
| 3,552,022 A | 1/1971 | Axelsson |
| 3,559,292 A | 2/1971 | Weissman |
| 3,563,233 A | 2/1971 | Bodine |
| 3,588,936 A | 6/1971 | Duve |
| 3,590,814 A | 7/1971 | Bennett et al. |
| D221,823 S | 9/1971 | Cook |
| 3,608,548 A | 9/1971 | Lewis |
| 3,638,264 A | 2/1972 | Walton |
| 3,642,344 A | 2/1972 | Corker |
| 3,651,576 A | 3/1972 | Massa |
| 3,660,902 A | 5/1972 | Axelsson |
| 3,667,483 A | 6/1972 | McCabe |
| 3,672,378 A | 6/1972 | Silverman |
| 3,676,218 A | 7/1972 | Sawyer |
| 3,685,080 A | 8/1972 | Hubner |
| 3,722,020 A | 3/1973 | Hills |
| 3,742,549 A | 7/1973 | Scopp et al. |
| 3,759,274 A | 9/1973 | Warner |
| 3,760,799 A | 9/1973 | Crowson |
| 3,792,504 A | 2/1974 | Smith |
| 3,809,977 A | 5/1974 | Balamuth et al. |
| 3,831,611 A | 8/1974 | Hendricks |
| 3,840,932 A | 10/1974 | Balamuth et al. |
| 3,847,167 A | 11/1974 | Brien |
| 3,851,984 A | 12/1974 | Crippa |
| D234,518 S | 3/1975 | Gerlich |
| 3,882,364 A | 5/1975 | Wright et al. |
| 3,902,510 A | 9/1975 | Roth |
| 3,903,601 A | 9/1975 | Anderson et al. |
| 3,939,599 A | 2/1976 | Henry et al. |
| 3,967,617 A | 7/1976 | Krolik |
| 3,973,558 A | 8/1976 | Stouffer et al. |
| 3,977,084 A | 8/1976 | Sloan |
| 3,978,852 A | 9/1976 | Annoni |
| 3,980,906 A | 9/1976 | Kuris et al. |
| 4,004,344 A | 1/1977 | Gold et al. |
| 4,005,722 A | 2/1977 | Bragg |
| 4,008,728 A | 2/1977 | Sanchez |
| 4,010,509 A | 3/1977 | Huish |
| 4,014,354 A | 3/1977 | Garrett |
| 4,019,522 A | 4/1977 | Elbreder |
| 4,033,008 A | 7/1977 | Warren et al. |
| 4,048,723 A | 9/1977 | Thorup |
| 4,051,571 A | 10/1977 | Ayers |
| 4,064,883 A | 12/1977 | Oldham |
| 4,133,339 A | 1/1979 | Naslund |
| 4,141,352 A | 2/1979 | Ebner et al. |
| 4,156,620 A | 5/1979 | Clemens |
| 4,173,828 A | 11/1979 | Lustig et al. |
| 4,177,434 A | 12/1979 | Ida |
| D254,162 S | 2/1980 | Barker |
| 4,192,035 A | 3/1980 | Kuris |
| 4,203,431 A | 5/1980 | Abura et al. |
| 4,205,664 A | 6/1980 | Baccialon |
| 4,219,619 A | 8/1980 | Zarow |
| 4,235,253 A | 11/1980 | Moore |
| 4,245,658 A | 1/1981 | Lecouturier |
| RE30,536 E | 3/1981 | Perdreaux, Jr. |
| 4,255,693 A | 3/1981 | Keidl |
| 4,265,257 A | 5/1981 | Salyer |
| 4,268,933 A | 5/1981 | Papas |
| 4,271,382 A | 6/1981 | Maeda et al. |
| 4,271,384 A | 6/1981 | Beiling et al. |
| 4,271,854 A | 6/1981 | Bengtsson |
| 4,275,363 A | 6/1981 | Mishiro et al. |
| 4,288,883 A | 9/1981 | Dolinsky |
| 4,289,486 A | 9/1981 | Sargeant |
| 4,303,064 A | 12/1981 | Buffa |
| 4,307,740 A | 12/1981 | Florindez et al. |
| 4,319,377 A | 3/1982 | Tarrson et al. |
| 4,319,595 A | 3/1982 | Ulrich |
| 4,326,547 A | 4/1982 | Verplank |
| 4,326,548 A | 4/1982 | Wagner |
| 4,326,549 A | 4/1982 | Hinding |
| 4,331,422 A | 5/1982 | Heyman |
| 4,333,197 A | 6/1982 | Kuris |
| 4,336,622 A | 6/1982 | Teague, Jr. et al. |
| D265,515 S | 7/1982 | Levine |
| 4,338,957 A | 7/1982 | Meibauer |
| D265,698 S | 8/1982 | Roth |
| 4,346,492 A | 8/1982 | Solow |
| 4,347,839 A | 9/1982 | Youngclaus, Jr. |
| 4,353,141 A | 10/1982 | Teague, Jr. et al. |
| 4,356,585 A | 11/1982 | Protell et al. |
| 4,381,478 A | 4/1983 | Saijo et al. |
| 4,395,665 A | 7/1983 | Buchas |
| 4,397,327 A | 8/1983 | Hadary |
| D270,972 S | 10/1983 | Rosofsky |
| D272,565 S | 2/1984 | Levine |
| D272,680 S | 2/1984 | Stocchi |
| 4,429,997 A | 2/1984 | Matthews |
| 4,432,729 A | 2/1984 | Fattaleh |
| 4,434,806 A | 3/1984 | Givens |
| 4,442,830 A | 4/1984 | Markau |
| D274,018 S | 5/1984 | Usui |
| 4,450,599 A | 5/1984 | Scheller et al. |
| 4,455,704 A | 6/1984 | Williams |
| 4,458,702 A | 7/1984 | Grollimund |
| 4,488,327 A | 12/1984 | Snider |
| 4,490,114 A | 12/1984 | Kleesattel |
| 4,505,678 A | 3/1985 | Andersson |
| 4,517,701 A | 5/1985 | Stanford, Jr. |
| 4,519,111 A | 5/1985 | Cavazza |
| 4,522,355 A | 6/1985 | Moran |
| 4,522,595 A | 6/1985 | Selvidge |
| 4,543,679 A | 10/1985 | Rosofsky et al. |
| D281,202 S | 11/1985 | Thompson |
| 4,562,413 A | 12/1985 | Mishiro et al. |
| 4,564,794 A | 1/1986 | Kilen et al. |
| 4,571,768 A | 2/1986 | Kawashima |
| 4,576,190 A | 3/1986 | Youssef |
| 4,577,649 A | 3/1986 | Shimenkov |
| 4,578,033 A | 3/1986 | Mossle et al. |
| D283,374 S | 4/1986 | Cheuk-Yiu |
| 4,585,415 A | 4/1986 | Hommann |
| 4,586,521 A | 5/1986 | Urso |
| D284,236 S | 6/1986 | Collet |
| D284,528 S | 7/1986 | Jurado |
| 4,603,448 A | 8/1986 | Middleton et al. |
| 4,605,025 A | 8/1986 | McSpadden |

(56) References Cited

U.S. PATENT DOCUMENTS

| | | |
|---|---|---|
| 4,608,019 A | 8/1986 | Kumabe et al. |
| 4,610,043 A | 9/1986 | Vezjak |
| 4,617,695 A | 10/1986 | Amos et al. |
| 4,617,718 A | 10/1986 | Andersson |
| 4,619,009 A | 10/1986 | Rosenstatter |
| D287,073 S | 12/1986 | Thompson |
| 4,634,376 A | 1/1987 | Mossle et al. |
| 4,644,937 A | 2/1987 | Hommann |
| 4,655,198 A | 4/1987 | Hommann |
| 4,672,706 A | 6/1987 | Hill |
| D292,448 S | 10/1987 | Vianello |
| 4,698,869 A | 10/1987 | Mierau et al. |
| 4,706,322 A | 11/1987 | Nicolas |
| 4,706,695 A | 11/1987 | Urso |
| D294,885 S | 3/1988 | Mollenhoff |
| 4,729,142 A | 3/1988 | Yoshioka |
| D297,467 S | 8/1988 | McCann |
| 4,766,630 A | 8/1988 | Hegemann |
| 4,776,054 A | 10/1988 | Rauch |
| 4,787,847 A | 11/1988 | Martin et al. |
| 4,791,940 A | 12/1988 | Hirshfeld et al. |
| 4,800,608 A | 1/1989 | Key |
| 4,802,255 A | 2/1989 | Breuer et al. |
| 4,811,445 A | 3/1989 | Lagieski et al. |
| 4,820,153 A | 4/1989 | Romhild et al. |
| 4,820,154 A | 4/1989 | Romhild et al. |
| 4,827,550 A | 5/1989 | Graham et al. |
| 4,827,551 A | 5/1989 | Maser et al. |
| 4,827,552 A | 5/1989 | Bojar et al. |
| 4,832,063 A | 5/1989 | Smole |
| D301,770 S | 6/1989 | Bethany |
| 4,844,104 A | 7/1989 | Martin |
| 4,845,795 A | 7/1989 | Crawford et al. |
| 4,856,133 A | 8/1989 | Sanchez |
| 4,864,676 A | 9/1989 | Schaiper |
| D303,876 S | 10/1989 | Clemens et al. |
| 4,871,396 A | 10/1989 | Tsujita et al. |
| 4,873,496 A | 10/1989 | Ohgihara et al. |
| 4,875,265 A | 10/1989 | Yoshida |
| 4,877,934 A | 10/1989 | Spinello |
| 4,879,781 A | 11/1989 | Desimone |
| 4,880,382 A | 11/1989 | Moret et al. |
| 4,887,052 A | 12/1989 | Murakami et al. |
| 4,892,191 A | 1/1990 | Nakamara |
| 4,908,902 A | 3/1990 | McNab et al. |
| 4,913,133 A | 4/1990 | Tichy |
| 4,913,176 A | 4/1990 | DeNiro |
| 4,922,936 A | 5/1990 | Buzzi et al. |
| D308,765 S | 6/1990 | Johnson |
| 4,974,278 A | 12/1990 | Hommann |
| 4,984,173 A | 1/1991 | Imam et al. |
| 4,989,287 A | 2/1991 | Scherer |
| 4,991,249 A | 2/1991 | Suroff |
| 4,995,403 A | 2/1991 | Beckman et al. |
| 5,000,684 A | 3/1991 | Odrich |
| 5,002,487 A | 3/1991 | Tichy |
| 5,007,127 A | 4/1991 | Paolo |
| 5,016,660 A | 5/1991 | Boggs |
| 5,020,179 A | 6/1991 | Scherer |
| 5,033,150 A | 7/1991 | Gross et al. |
| D318,918 S | 8/1991 | Hartwein |
| D319,363 S | 8/1991 | Uemura et al. |
| 5,046,212 A | 9/1991 | O'Conke |
| 5,050,625 A | 9/1991 | Siekmann |
| 5,054,149 A | 10/1991 | Si-Hoe et al. |
| D321,285 S | 11/1991 | Hirabayashi |
| 5,062,797 A | 11/1991 | Gonser |
| 5,067,223 A | 11/1991 | Bruno |
| D321,986 S | 12/1991 | Snyder et al. |
| 5,068,939 A | 12/1991 | Holland |
| 5,069,233 A | 12/1991 | Ritter |
| 5,069,621 A | 12/1991 | Paradis |
| 5,071,348 A | 12/1991 | Woog |
| 5,072,477 A | 12/1991 | Pai |
| 5,072,482 A | 12/1991 | Bojar et al. |
| 5,077,855 A | 1/1992 | Ambasz |
| 5,085,236 A | 2/1992 | Odneal et al. |
| 5,088,145 A | 2/1992 | Whitefield |
| D324,957 S | 3/1992 | Piano |
| 5,094,256 A | 3/1992 | Barth |
| 5,095,470 A | 3/1992 | Oka et al. |
| 5,100,321 A | 3/1992 | Coss et al. |
| 5,120,225 A | 6/1992 | Amit |
| 5,123,841 A | 6/1992 | Millner |
| 5,125,837 A | 6/1992 | Warrin et al. |
| 5,133,661 A | 7/1992 | Euvrard |
| 5,138,733 A | 8/1992 | Bock |
| 5,145,369 A | 9/1992 | Lustig et al. |
| 5,146,643 A | 9/1992 | Bojar et al. |
| 5,150,492 A | 9/1992 | Suroff |
| 5,151,030 A | 9/1992 | Comeaux |
| D330,116 S | 10/1992 | Crawford et al. |
| D330,286 S | 10/1992 | Curtis et al. |
| D330,458 S | 10/1992 | Curtis et al. |
| 5,152,394 A | 10/1992 | Hughes |
| 5,163,375 A | 11/1992 | Withers et al. |
| 5,165,131 A | 11/1992 | Suroff |
| 5,167,193 A | 12/1992 | Withers et al. |
| 5,169,313 A | 12/1992 | Kline |
| 5,170,809 A | 12/1992 | Imai et al. |
| 5,174,314 A | 12/1992 | Charatan |
| 5,176,157 A | 1/1993 | Mazza |
| 5,177,826 A | 1/1993 | Vrignaud et al. |
| 5,180,363 A | 1/1993 | Idemoto et al. |
| D332,873 S | 2/1993 | Hall |
| 5,183,063 A | 2/1993 | Ringle et al. |
| 5,183,156 A | 2/1993 | Bruno |
| 5,184,368 A | 2/1993 | Holland |
| 5,184,632 A | 2/1993 | Gross et al. |
| 5,186,191 A | 2/1993 | Loubier |
| 5,188,133 A | 2/1993 | Romanus |
| 5,189,751 A | 3/1993 | Giuliani et al. |
| 5,193,678 A | 3/1993 | Janocik et al. |
| 5,198,732 A | 3/1993 | Morimoto |
| D334,472 S | 4/1993 | Curtis et al. |
| 5,201,092 A | 4/1993 | Colson |
| D335,579 S | 5/1993 | Chuang |
| 5,207,773 A | 5/1993 | Henderson |
| 5,213,434 A | 5/1993 | Hahn |
| 5,214,819 A | 6/1993 | Kirchner |
| 5,217,031 A | 6/1993 | Santoro |
| 5,224,500 A | 7/1993 | Stella |
| 5,226,206 A | 7/1993 | Davidovitz et al. |
| 5,236,358 A | 8/1993 | Sieffert |
| 5,245,117 A | 9/1993 | Withers et al. |
| 5,246,022 A | 9/1993 | Israel et al. |
| 5,247,716 A | 9/1993 | Bock |
| 5,253,382 A | 10/1993 | Beny |
| 5,261,430 A | 11/1993 | Mochel |
| 5,263,218 A | 11/1993 | Giuliani et al. |
| D341,943 S | 12/1993 | Si-Hoe |
| D342,160 S | 12/1993 | Curtis et al. |
| D342,161 S | 12/1993 | Curtis et al. |
| D342,162 S | 12/1993 | Curtis et al. |
| 5,267,579 A | 12/1993 | Bushberger |
| D343,064 S | 1/1994 | Reno |
| 5,279,314 A | 1/1994 | Poulos et al. |
| 5,289,604 A | 3/1994 | Kressner |
| 5,293,886 A | 3/1994 | Czapor |
| 5,294,896 A | 3/1994 | Kjellander et al. |
| D346,212 S | 4/1994 | Hosl |
| 5,299,723 A | 4/1994 | Hempel |
| 5,301,381 A | 4/1994 | Klupt |
| 5,305,492 A | 4/1994 | Giuliani et al. |
| D346,697 S | 5/1994 | O'Conke |
| 5,309,590 A | 5/1994 | Giuliani et al. |
| 5,309,591 A | 5/1994 | Hägele et al. |
| 5,311,632 A | 5/1994 | Center |
| 5,311,633 A | 5/1994 | Herzog et al. |
| 5,315,731 A | 5/1994 | Millar |
| D347,943 S | 6/1994 | Perry |
| 5,323,796 A | 6/1994 | Urso |
| 5,335,389 A | 8/1994 | Curtis et al. |
| 5,337,435 A | 8/1994 | Krasner et al. |

(56) References Cited

U.S. PATENT DOCUMENTS

| | | |
|---|---|---|
| 5,339,482 A | 8/1994 | Desimone et al. |
| 5,341,534 A | 8/1994 | Serbinski et al. |
| 5,341,537 A | 8/1994 | Curtis et al. |
| 5,351,358 A | 10/1994 | Larrimore |
| 5,353,460 A | 10/1994 | Bauman |
| 5,354,246 A | 10/1994 | Gotman |
| 5,355,638 A | 10/1994 | Hoffman |
| 5,358,328 A | 10/1994 | Inoue et al. |
| D352,396 S | 11/1994 | Curtis et al. |
| D352,829 S | 11/1994 | Perry |
| 5,359,747 A | 11/1994 | Amakasu |
| 5,365,627 A | 11/1994 | Jousson et al. |
| D353,490 S | 12/1994 | Hartwein |
| 5,369,831 A | 12/1994 | Bock |
| 5,371,915 A | 12/1994 | Key |
| 5,373,602 A | 12/1994 | Bang |
| D354,168 S | 1/1995 | Hartwein |
| 5,378,153 A | 1/1995 | Giuliani et al. |
| 5,383,242 A | 1/1995 | Bigler et al. |
| 5,392,483 A | 2/1995 | Heinzelman et al. |
| 5,393,229 A | 2/1995 | Ram |
| 5,396,678 A | 3/1995 | Bredall et al. |
| 5,398,368 A | 3/1995 | Elder |
| 5,400,811 A | 3/1995 | Meibauer |
| 5,404,608 A | 4/1995 | Hommann |
| 5,406,664 A | 4/1995 | Hukuba |
| 5,406,965 A | 4/1995 | Levine |
| D358,486 S | 5/1995 | Loew |
| D358,713 S | 5/1995 | Perry |
| D358,801 S | 5/1995 | Vos |
| 5,411,041 A | 5/1995 | Ritter |
| 5,412,827 A | 5/1995 | Muller et al. |
| 5,416,942 A | 5/1995 | Baldacci et al. |
| 5,419,346 A | 5/1995 | Tipp |
| 5,419,703 A | 5/1995 | Warrin et al. |
| D358,938 S | 6/1995 | Schneider et al. |
| 5,421,726 A | 6/1995 | Okada |
| 5,435,032 A | 7/1995 | McDougall |
| 5,438,726 A | 8/1995 | Leite |
| 5,446,940 A | 9/1995 | Curtis et al. |
| D363,605 S | 10/1995 | Kou et al. |
| 5,459,898 A | 10/1995 | Bacolot |
| 5,461,744 A | 10/1995 | Merbach |
| 5,467,494 A | 11/1995 | Muller et al. |
| 5,467,495 A | 11/1995 | Boland et al. |
| 5,482,466 A | 1/1996 | Haynes |
| 5,484,281 A | 1/1996 | Renow et al. |
| 5,496,256 A | 3/1996 | Bock et al. |
| 5,499,420 A | 3/1996 | Boland |
| 5,504,958 A | 4/1996 | Herzog |
| 5,504,959 A | 4/1996 | Yukawa et al. |
| 5,511,270 A | 4/1996 | Eliachar et al. |
| 5,511,275 A | 4/1996 | Volpenhein et al. |
| D370,125 S | 5/1996 | Craft et al. |
| 5,518,012 A | 5/1996 | Dolan et al. |
| D370,347 S | 6/1996 | Heinzelman et al. |
| 5,529,494 A | 6/1996 | Vlacancich |
| D371,242 S | 7/1996 | Shimatsu et al. |
| 5,530,981 A | 7/1996 | Chen |
| 5,544,382 A | 8/1996 | Giuliani et al. |
| 5,545,968 A | 8/1996 | Hilfinger et al. |
| 5,546,624 A | 8/1996 | Bock |
| 5,546,626 A | 8/1996 | Chung |
| 5,561,881 A | 10/1996 | Klinger et al. |
| D375,841 S | 11/1996 | Serbinski |
| 5,573,020 A | 11/1996 | Robinson |
| 5,577,285 A | 11/1996 | Drossler |
| D376,695 S | 12/1996 | Tveras |
| 5,579,786 A | 12/1996 | Wolk et al. |
| 5,584,690 A | 12/1996 | Maassarani |
| 5,588,452 A | 12/1996 | Peck |
| 5,606,984 A | 3/1997 | Gao |
| 5,609,170 A | 3/1997 | Roth |
| 5,613,258 A | 3/1997 | Hilfinger et al. |
| 5,613,259 A | 3/1997 | Craft et al. |
| 5,617,601 A | 4/1997 | McDougall |
| 5,617,602 A | 4/1997 | Okada |
| 5,618,275 A | 4/1997 | Bock |
| 5,619,766 A | 4/1997 | Zhadanov et al. |
| 5,623,746 A | 4/1997 | Ichiro |
| 5,625,916 A | 5/1997 | McDougall |
| 5,628,082 A | 5/1997 | Moskovich |
| D380,903 S | 7/1997 | Moskovich |
| D381,468 S | 7/1997 | Dolan et al. |
| 5,651,157 A | 7/1997 | Hahn |
| D382,407 S | 8/1997 | Craft et al. |
| 5,652,990 A | 8/1997 | Driesen et al. |
| 5,653,591 A | 8/1997 | Loge |
| 5,678,274 A | 10/1997 | Liu |
| 5,678,578 A | 10/1997 | Kossak et al. |
| D386,314 S | 11/1997 | Moskovich |
| 5,687,446 A | 11/1997 | Chen et al. |
| 5,697,117 A | 12/1997 | Craft |
| 5,700,146 A | 12/1997 | Kucar |
| RE35,712 E | 1/1998 | Murayama |
| 5,704,087 A | 1/1998 | Strub |
| 5,709,233 A | 1/1998 | Boland et al. |
| 5,718,667 A | 2/1998 | Sugimoto et al. |
| 5,732,433 A | 3/1998 | Göcking et al. |
| 5,735,011 A | 4/1998 | Asher |
| 5,738,575 A | 4/1998 | Bock |
| 5,742,972 A | 4/1998 | Bredall et al. |
| 5,749,380 A | 5/1998 | Zebuhr |
| 5,762,078 A | 6/1998 | Zebuhr |
| 5,775,346 A | 7/1998 | Szyszkowski |
| 5,784,742 A | 7/1998 | Giuliani et al. |
| 5,784,743 A | 7/1998 | Shek |
| D397,251 S | 8/1998 | Eguchi et al. |
| D397,254 S | 8/1998 | Moskovich |
| 5,787,908 A | 8/1998 | Robinson |
| 5,794,295 A | 8/1998 | Shen |
| 5,815,872 A | 10/1998 | Meginniss, III et al. |
| 5,816,271 A | 10/1998 | Urso |
| 5,822,821 A | 10/1998 | Sham |
| 5,827,064 A | 10/1998 | Bock |
| D400,713 S | 11/1998 | Solanki |
| 5,836,030 A | 11/1998 | Hazeu et al. |
| 5,842,244 A | 12/1998 | Hilfinger et al. |
| 5,850,655 A | 12/1998 | Göcking et al. |
| 5,851,514 A | 12/1998 | Hassan et al. |
| D403,511 S | 1/1999 | Serbinski |
| 5,855,216 A | 1/1999 | Robinson |
| 5,862,558 A | 1/1999 | Hilfinger et al. |
| 5,864,911 A | 2/1999 | Arnoux |
| 5,864,915 A | 2/1999 | Ra |
| 5,867,856 A | 2/1999 | Herzog |
| 5,875,797 A | 3/1999 | Chiang et al. |
| 5,893,175 A | 4/1999 | Cooper |
| 5,896,614 A | 4/1999 | Flewitt |
| 5,896,615 A | 4/1999 | Zaksenberg |
| 5,899,693 A | 5/1999 | Himeno et al. |
| 5,900,230 A | 5/1999 | Cutler |
| 5,901,397 A | 5/1999 | Hafele et al. |
| D410,787 S | 6/1999 | Barre et al. |
| 5,908,038 A | 6/1999 | Bennett |
| D411,769 S | 7/1999 | Wright |
| 5,921,254 A | 7/1999 | Carlucci et al. |
| 5,927,300 A | 7/1999 | Boland et al. |
| 5,927,976 A | 7/1999 | Wu |
| 5,930,858 A | 8/1999 | Jung |
| 5,931,170 A | 8/1999 | Wu |
| 5,934,908 A | 8/1999 | Woog et al. |
| 5,943,723 A | 8/1999 | Hilfinger et al. |
| 5,944,033 A | 8/1999 | Robinson |
| D413,694 S | 9/1999 | Bennett |
| D414,937 S | 10/1999 | Cornu et al. |
| D414,939 S | 10/1999 | Pedro, Jr. et al. |
| 5,974,613 A | 11/1999 | Herzog |
| 5,974,615 A | 11/1999 | Schwarz-Hartmann et al. |
| 5,980,541 A | 11/1999 | Tenzer |
| 5,987,681 A | 11/1999 | Hahn et al. |
| 5,991,957 A | 11/1999 | Watanabe |
| D417,960 S | 12/1999 | Moskovich et al. |
| 6,000,083 A | 12/1999 | Blaustein et al. |

(56) References Cited

U.S. PATENT DOCUMENTS

| | | |
|---|---|---|
| 6,009,589 A | 1/2000 | Driesen et al. |
| 6,021,538 A | 2/2000 | Kressner et al. |
| 6,026,828 A | 2/2000 | Altshuler |
| 6,032,313 A | 3/2000 | Tsang |
| 6,035,476 A | 3/2000 | Underwood et al. |
| 6,047,429 A | 4/2000 | Wu |
| 6,047,711 A | 4/2000 | Wagner |
| 6,050,818 A | 4/2000 | Boland et al. |
| RE36,699 E | 5/2000 | Murayama |
| D423,784 S | 5/2000 | Joulin |
| 6,065,176 A | 5/2000 | Watanabe et al. |
| 6,081,957 A | 7/2000 | Webb |
| 6,092,252 A | 7/2000 | Fischer et al. |
| 6,095,811 A | 8/2000 | Stearns |
| 6,102,700 A | 8/2000 | Haczek et al. |
| 6,106,294 A | 8/2000 | Daniel |
| 6,138,310 A | 10/2000 | Porper et al. |
| 6,140,723 A | 10/2000 | Matsui et al. |
| 6,148,462 A | 11/2000 | Zseng |
| D434,563 S | 12/2000 | Lim et al. |
| 6,154,912 A | 12/2000 | Li |
| 6,162,202 A | 12/2000 | Sicurelli et al. |
| 6,164,967 A | 12/2000 | Sale et al. |
| 6,165,131 A | 12/2000 | Cuse et al. |
| D437,090 S | 1/2001 | Lang et al. |
| D437,091 S | 1/2001 | Lang et al. |
| 6,178,579 B1 | 1/2001 | Blaustein et al. |
| D437,663 S | 2/2001 | Lang et al. |
| D437,976 S | 2/2001 | Narayanan et al. |
| D437,977 S | 2/2001 | Lang et al. |
| D438,306 S | 2/2001 | Narayanan |
| 6,183,254 B1 | 2/2001 | Cohen |
| 6,195,828 B1 | 3/2001 | Fritsch |
| 6,202,242 B1 | 3/2001 | Salmon et al. |
| 6,203,320 B1 | 3/2001 | Williams et al. |
| 6,220,857 B1 | 4/2001 | Abels |
| 6,230,354 B1 | 5/2001 | Sproat |
| 6,230,717 B1 | 5/2001 | Marx et al. |
| 6,233,773 B1 | 5/2001 | Karge et al. |
| 6,237,178 B1 | 5/2001 | Krammer et al. |
| D444,629 S | 7/2001 | Etter et al. |
| 6,253,404 B1 | 7/2001 | Boland et al. |
| 6,267,593 B1 | 7/2001 | Haczek et al. |
| 6,299,444 B1 | 10/2001 | Cohen |
| 6,308,358 B2 | 10/2001 | Gruber et al. |
| 6,308,359 B2 | 10/2001 | Fritsch et al. |
| 6,341,400 B1 | 1/2002 | Kobayashi et al. |
| 6,343,396 B1 | 2/2002 | Simovitz et al. |
| 6,343,400 B1 | 2/2002 | Massholder et al. |
| 6,347,425 B1 | 2/2002 | Fattori et al. |
| 6,349,442 B1 | 2/2002 | Cohen et al. |
| 6,353,956 B1 | 3/2002 | Berge |
| 6,360,395 B2 | 3/2002 | Blaustein et al. |
| 6,360,398 B1 | 3/2002 | Wiegner et al. |
| 6,363,565 B1 | 4/2002 | Paffrath |
| 6,365,108 B1 | 4/2002 | Philyaw |
| 6,367,108 B1 | 4/2002 | Fritsch et al. |
| 6,374,448 B2 | 4/2002 | Seifert |
| 6,375,459 B1 | 4/2002 | Kamen et al. |
| 6,381,795 B1 | 5/2002 | Hofmann et al. |
| 6,401,288 B1 | 6/2002 | Porper et al. |
| 6,421,865 B1 | 7/2002 | McDougall |
| 6,421,866 B1 | 7/2002 | McDougall |
| 6,421,867 B1 | 7/2002 | Weihrauch |
| 6,422,867 B2 | 7/2002 | Lang et al. |
| 6,434,773 B1 | 8/2002 | Kuo |
| D463,627 S | 9/2002 | Lang et al. |
| 6,446,294 B1 | 9/2002 | Specht |
| 6,446,295 B1 | 9/2002 | Calabrese |
| 6,447,293 B1 | 9/2002 | Sokol et al. |
| 6,453,497 B1 | 9/2002 | Chiang et al. |
| 6,453,498 B1 | 9/2002 | Wu |
| 6,453,499 B1 | 9/2002 | Leuermann |
| 6,463,615 B1 | 10/2002 | Gruber et al. |
| 6,490,747 B1 | 12/2002 | Metwally |
| 6,497,237 B1 | 12/2002 | Ali |
| 6,510,575 B2 | 1/2003 | Calabrese |
| 6,526,994 B1 | 3/2003 | Santoro |
| 6,536,066 B2 | 3/2003 | Dickie |
| 6,564,940 B2 | 5/2003 | Blaustein et al. |
| 6,571,804 B2 | 6/2003 | Adler |
| 6,574,820 B1 | 6/2003 | DePuydt et al. |
| 6,581,233 B1 | 6/2003 | Cheng |
| 6,581,234 B2 | 6/2003 | Lee et al. |
| 6,588,042 B2 | 7/2003 | Fritsch et al. |
| 6,599,048 B2 | 7/2003 | Kuo |
| 6,609,527 B2 | 8/2003 | Brown |
| 6,609,910 B2 | 8/2003 | Narayanan |
| 6,619,219 B2 | 9/2003 | Marcon et al. |
| 6,622,333 B1 | 9/2003 | Rehkemper et al. |
| 6,647,577 B2 | 11/2003 | Tam |
| D484,311 S | 12/2003 | Cacka et al. |
| 6,654,979 B2 | 12/2003 | Calabrese |
| 6,659,674 B2 | 12/2003 | Carlucci et al. |
| 6,665,901 B2 | 12/2003 | Driesen et al. |
| 6,691,363 B2 | 2/2004 | Huen |
| 6,701,565 B2 | 3/2004 | Hafemann |
| 6,709,185 B2 | 3/2004 | Lefevre |
| 6,721,986 B2 | 4/2004 | Zhuan |
| 6,725,490 B2 | 4/2004 | Blaustein et al. |
| 6,735,803 B2 | 5/2004 | Kuo |
| 6,735,804 B2 | 5/2004 | Carlucci et al. |
| 6,739,012 B2 | 5/2004 | Grez et al. |
| 6,751,823 B2 | 6/2004 | Biro et al. |
| 6,760,945 B2 | 7/2004 | Ferber et al. |
| 6,760,946 B2 | 7/2004 | DePuydt |
| 6,766,548 B1 | 7/2004 | Lukas et al. |
| 6,766,549 B2 | 7/2004 | Klupt |
| 6,766,807 B2 | 7/2004 | Piccolo et al. |
| 6,779,126 B1 | 8/2004 | Lin et al. |
| 6,779,215 B2 | 8/2004 | Hartman et al. |
| 6,785,926 B2 | 9/2004 | Green |
| 6,785,929 B2 | 9/2004 | Fritsch et al. |
| 6,792,640 B2 | 9/2004 | Lev |
| 6,795,993 B2 | 9/2004 | Lin |
| 6,798,169 B2 | 9/2004 | Stratmann et al. |
| 6,799,346 B2 | 10/2004 | Jeng et al. |
| 6,802,097 B2 | 10/2004 | Hafliger et al. |
| 6,808,331 B2 | 10/2004 | Hall et al. |
| 6,810,550 B1 | 11/2004 | Wuelknitz et al. |
| 6,813,793 B2 | 11/2004 | Eliav |
| 6,813,794 B2 | 11/2004 | Weng |
| 6,821,119 B2 | 11/2004 | Shortt et al. |
| 6,823,875 B2 | 11/2004 | Hotta et al. |
| 6,827,910 B2 | 12/2004 | Chen |
| 6,829,801 B2 | 12/2004 | Schutz |
| 6,832,819 B1 | 12/2004 | Weihrauch |
| D500,599 S | 1/2005 | Callaghan |
| D501,084 S | 1/2005 | Schaefer et al. |
| 6,836,917 B2 | 1/2005 | Blaustein et al. |
| 6,845,537 B2 | 1/2005 | Wong |
| 6,848,141 B2 | 2/2005 | Eliav et al. |
| 6,851,150 B2 | 2/2005 | Chiang |
| 6,851,153 B2 | 2/2005 | Lehman |
| 6,854,965 B2 | 2/2005 | Ebner et al. |
| 6,862,771 B1 | 3/2005 | Muller |
| 6,871,373 B2 | 3/2005 | Driesen et al. |
| 6,874,509 B2 | 4/2005 | Bergman |
| 6,886,207 B1 | 5/2005 | Solanki |
| 6,889,401 B2 | 5/2005 | Fattori et al. |
| 6,889,829 B2 | 5/2005 | Lev et al. |
| 6,892,412 B2 | 5/2005 | Gatzemeyer et al. |
| 6,892,413 B2 | 5/2005 | Blaustein et al. |
| 6,895,625 B2 | 5/2005 | Lev et al. |
| 6,895,629 B1 | 5/2005 | Wenzler |
| 6,902,337 B1 | 6/2005 | Kuo |
| 6,907,636 B2 | 6/2005 | Hafemann |
| 6,918,153 B2 | 7/2005 | Gruber |
| 6,920,659 B2 | 7/2005 | Cacka et al. |
| 6,920,660 B2 | 7/2005 | Lam |
| 6,928,685 B1 | 8/2005 | Blaustein et al. |
| 6,931,688 B2 | 8/2005 | Moskovich et al. |
| 6,938,293 B2 | 9/2005 | Eliav et al. |
| 6,938,294 B2 | 9/2005 | Fattori et al. |

(56) References Cited

U.S. PATENT DOCUMENTS

| | | |
|---|---|---|
| 6,944,901 B2 | 9/2005 | Gatzemeyer et al. |
| 6,945,397 B2 | 9/2005 | Brattesani et al. |
| 6,948,209 B2 | 9/2005 | Chan |
| 6,952,854 B2 | 10/2005 | Blaustein et al. |
| 6,952,855 B2 | 10/2005 | Lev et al. |
| 6,954,961 B2 | 10/2005 | Ferber et al. |
| 6,955,539 B2 | 10/2005 | Shortt et al. |
| 6,957,468 B2 | 10/2005 | Driesen et al. |
| 6,957,469 B2 | 10/2005 | Davies |
| 6,966,093 B2 | 11/2005 | Eliav et al. |
| 6,973,694 B2 | 12/2005 | Schutz et al. |
| 6,983,507 B2 | 1/2006 | McDougall |
| 6,988,777 B2 | 1/2006 | Pfenniger et al. |
| 6,990,706 B2 | 1/2006 | Broecker et al. |
| D515,318 S | 2/2006 | Chan et al. |
| 6,993,803 B2 | 2/2006 | Chan |
| 6,997,191 B2 | 2/2006 | Nudo, Sr. |
| 7,007,331 B2 | 3/2006 | Davies et al. |
| 7,008,225 B2 | 3/2006 | Ito et al. |
| 7,020,925 B1 | 4/2006 | Gitelis |
| 7,021,851 B1 | 4/2006 | King |
| 7,024,717 B2 | 4/2006 | Hilscher et al. |
| 7,024,718 B2 | 4/2006 | Chu |
| 7,036,180 B2 | 5/2006 | Hanlon |
| 7,055,205 B2 | 6/2006 | Aoyama |
| 7,059,334 B2 | 6/2006 | Dougan et al. |
| 7,065,821 B2 | 6/2006 | Fattori |
| RE39,185 E | 7/2006 | Noe et al. |
| 7,070,354 B1 | 7/2006 | Gutierrez-Caro |
| 7,080,980 B2 | 7/2006 | Klupt |
| 7,082,638 B2 | 8/2006 | Koh |
| 7,082,950 B2 | 8/2006 | Kossak et al. |
| 7,086,111 B2 | 8/2006 | Hilscher et al. |
| 7,089,621 B2 | 8/2006 | Hohlbein |
| 7,120,960 B2 | 10/2006 | Hilscher et al. |
| 7,122,921 B2 | 10/2006 | Hall et al. |
| 7,124,461 B2 | 10/2006 | Blaustein et al. |
| 7,124,462 B2 | 10/2006 | Lee |
| 7,128,492 B1 | 10/2006 | Thames, Jr. |
| 7,137,136 B1 | 11/2006 | Gatzemeyer et al. |
| 7,140,058 B2 | 11/2006 | Gatzemeyer et al. |
| 7,146,675 B2 | 12/2006 | Ansari et al. |
| 7,162,764 B2 | 1/2007 | Drossler et al. |
| 7,162,767 B2 | 1/2007 | Pfenniger et al. |
| 7,168,122 B1 | 1/2007 | Riddell |
| 7,168,125 B2 | 1/2007 | Hohlbein |
| 7,174,596 B2 | 2/2007 | Fischer et al. |
| 7,175,238 B1 | 2/2007 | Barman |
| 7,181,799 B2 | 2/2007 | Gavney, Jr. et al. |
| 7,185,383 B2 | 3/2007 | Gatzemeyer et al. |
| 7,186,226 B2 | 3/2007 | Woolley |
| D540,542 S | 4/2007 | Harada |
| 7,198,487 B2 | 4/2007 | Luettgen et al. |
| 7,207,080 B2 | 4/2007 | Hilscher et al. |
| 7,210,184 B2 | 5/2007 | Eliav et al. |
| 7,213,293 B1 | 5/2007 | Schraga |
| 7,213,995 B2 | 5/2007 | Bravo-Loubriel |
| 7,217,332 B2 | 5/2007 | Brown, Jr. et al. |
| 7,222,381 B2 | 5/2007 | Kraemer |
| 7,222,382 B2 | 5/2007 | Choi et al. |
| 7,225,494 B2 | 6/2007 | Chan et al. |
| 7,228,583 B2 | 6/2007 | Chan et al. |
| 7,234,187 B2 | 6/2007 | Blaustein et al. |
| 7,234,192 B2 | 6/2007 | Barbar |
| 7,469,440 B2 | 12/2008 | Boland et al. |
| 7,554,225 B2 | 6/2009 | Kraus et al. |
| 7,732,952 B1 | 6/2010 | Taylor |
| 7,857,623 B2 | 12/2010 | Grez |
| 8,032,964 B2 | 10/2011 | Farrell et al. |
| 8,196,245 B2 | 6/2012 | Schwarz-Hartmann et al. |
| 8,201,295 B2 | 6/2012 | Gatzemeyer et al. |
| 8,256,979 B2 | 9/2012 | Hilscher et al. |
| 8,418,300 B2 | 4/2013 | Miller et al. |
| 8,424,144 B2 * | 4/2013 | Nanda ............ A46B 15/0036 15/22.1 |
| 8,453,285 B2 | 6/2013 | Dickie |
| 8,533,892 B2 | 9/2013 | Dabrowski |
| 8,769,758 B2 | 7/2014 | Jungnickel et al. |
| 8,943,634 B2 | 2/2015 | Sokol |
| 9,565,927 B2 | 2/2017 | Bloch et al. |
| 10,610,008 B2 | 4/2020 | Wagner et al. |
| 2001/0035194 A1 | 11/2001 | Narayanan |
| 2001/0039955 A1 | 11/2001 | Winters et al. |
| 2001/0054563 A1 | 12/2001 | Lang et al. |
| 2002/0017474 A1 | 2/2002 | Blaustein et al. |
| 2002/0029988 A1 | 3/2002 | Blaustein et al. |
| 2002/0032941 A1 | 3/2002 | Blaustein et al. |
| 2002/0039720 A1 | 4/2002 | Marx et al. |
| 2002/0059685 A1 | 5/2002 | Paffrath |
| 2002/0078514 A1 | 6/2002 | Blaustein et al. |
| 2002/0084707 A1 | 7/2002 | Tang |
| 2002/0088068 A1 | 7/2002 | Levy et al. |
| 2002/0090252 A1 | 7/2002 | Hall et al. |
| 2002/0092104 A1 | 7/2002 | Ferber |
| 2002/0095734 A1 | 7/2002 | Wong |
| 2002/0100134 A1 | 8/2002 | Dunn et al. |
| 2002/0106607 A1 | 8/2002 | Horowitz |
| 2002/0137728 A1 | 9/2002 | Montgomery |
| 2002/0138926 A1 | 10/2002 | Brown, Jr. et al. |
| 2002/0152563 A1 | 10/2002 | Sato |
| 2002/0152564 A1 | 10/2002 | Blaustein et al. |
| 2002/0152565 A1 | 10/2002 | Klupt |
| 2002/0174498 A1 | 11/2002 | Li |
| 2002/0178519 A1 | 12/2002 | Zarlengo |
| 2003/0005544 A1 | 1/2003 | Felix |
| 2003/0033679 A1 | 2/2003 | Fattori et al. |
| 2003/0033680 A1 | 2/2003 | Davies et al. |
| 2003/0041396 A1 | 3/2003 | Dickie |
| 2003/0064348 A1 | 4/2003 | Sokol et al. |
| 2003/0066145 A1 | 4/2003 | Prineppi |
| 2003/0074751 A1 | 4/2003 | Wu |
| 2003/0079305 A1 | 5/2003 | Takahata et al. |
| 2003/0084525 A1 | 5/2003 | Blaustein et al. |
| 2003/0084526 A1 | 5/2003 | Brown et al. |
| 2003/0084527 A1 | 5/2003 | Brown et al. |
| 2003/0097723 A1 | 5/2003 | Li |
| 2003/0099502 A1 | 5/2003 | Lai |
| 2003/0101526 A1 | 6/2003 | Hilscher |
| 2003/0106565 A1 | 6/2003 | Andrews |
| 2003/0140435 A1 | 7/2003 | Eliav et al. |
| 2003/0140437 A1 | 7/2003 | Eliav et al. |
| 2003/0140937 A1 | 7/2003 | Cook |
| 2003/0150474 A1 | 8/2003 | Doyscher |
| 2003/0154567 A1 | 8/2003 | Drossler et al. |
| 2003/0154568 A1 | 8/2003 | Boland et al. |
| 2003/0163881 A1 | 9/2003 | Driesen et al. |
| 2003/0163882 A1 | 9/2003 | Blaustein et al. |
| 2003/0182743 A1 | 10/2003 | Gatzemeyer et al. |
| 2003/0182746 A1 | 10/2003 | Fattori et al. |
| 2003/0192139 A1 | 10/2003 | Fattori et al. |
| 2003/0196283 A1 | 10/2003 | Eliav et al. |
| 2003/0196677 A1 | 10/2003 | Wiseman |
| 2003/0213075 A1 | 11/2003 | Hui et al. |
| 2003/0221267 A1 | 12/2003 | Chan |
| 2003/0221269 A1 | 12/2003 | Zhuan |
| 2003/0226223 A1 | 12/2003 | Chan |
| 2004/0010870 A1 | 1/2004 | McNair |
| 2004/0010871 A1 | 1/2004 | Nishinaka et al. |
| 2004/0016068 A1 | 1/2004 | Lee |
| 2004/0016069 A1 | 1/2004 | Lee |
| 2004/0034951 A1 | 2/2004 | Davies et al. |
| 2004/0045106 A1 | 3/2004 | Lam |
| 2004/0045107 A1 | 3/2004 | Egeresi |
| 2004/0049867 A1 | 3/2004 | Hui |
| 2004/0049868 A1 | 3/2004 | Ng |
| 2004/0060137 A1 | 4/2004 | Eliav |
| 2004/0063603 A1 | 4/2004 | Dave et al. |
| 2004/0068811 A1 | 4/2004 | Fulop et al. |
| 2004/0074026 A1 | 4/2004 | Blaustein et al. |
| 2004/0083566 A1 | 5/2004 | Blaustein et al. |
| 2004/0087882 A1 | 5/2004 | Roberts et al. |
| 2004/0088806 A1 | 5/2004 | DePuydt et al. |
| 2004/0088807 A1 | 5/2004 | Blaustein et al. |
| 2004/0091834 A1 | 5/2004 | Rizoiu et al. |

(56) References Cited

U.S. PATENT DOCUMENTS

| | | |
|---|---|---|
| 2004/0107521 A1 | 6/2004 | Chan et al. |
| 2004/0119344 A1 | 6/2004 | Lau et al. |
| 2004/0123409 A1 | 7/2004 | Dickie |
| 2004/0128778 A1 | 7/2004 | Wong |
| 2004/0129296 A1 | 7/2004 | Treacy et al. |
| 2004/0134001 A1 | 7/2004 | Chan |
| 2004/0143917 A1 | 7/2004 | Ek |
| 2004/0154112 A1 | 8/2004 | Braun et al. |
| 2004/0163191 A1 | 8/2004 | Cuffaro et al. |
| 2004/0168269 A1 | 9/2004 | Kunita et al. |
| 2004/0168272 A1 | 9/2004 | Prineppi |
| 2004/0177458 A1 | 9/2004 | Chan et al. |
| 2004/0187889 A1 | 9/2004 | Kemp et al. |
| 2004/0200016 A1 | 10/2004 | Chan et al. |
| 2005/0004498 A1 | 1/2005 | Klupt |
| 2005/0008986 A1 | 1/2005 | Sokol et al. |
| 2005/0102773 A1 | 5/2005 | Obermann et al. |
| 2005/0144745 A1 | 7/2005 | Russell |
| 2005/0189000 A1 | 9/2005 | Cacka et al. |
| 2005/0255427 A1 | 11/2005 | Shortt et al. |
| 2005/0266376 A1 | 12/2005 | Sokol et al. |
| 2006/0010624 A1 | 1/2006 | Cleland |
| 2006/0078844 A1 | 4/2006 | Goldman et al. |
| 2007/0151051 A1 | 7/2007 | Filsouf |
| 2007/0209127 A1 | 9/2007 | DeVitis |
| 2008/0213731 A1 | 9/2008 | Fishburne |
| 2008/0307591 A1 | 12/2008 | Farrell et al. |
| 2009/0019650 A1 | 1/2009 | Grez et al. |
| 2009/0019651 A1 | 1/2009 | Dickie |
| 2009/0178215 A1 | 7/2009 | Gall |
| 2010/0055634 A1 | 3/2010 | Spaulding et al. |
| 2010/0132139 A1 | 6/2010 | Jungnickel |
| 2010/0186179 A1 | 7/2010 | Miller |
| 2011/0010874 A1 | 1/2011 | Dickie |
| 2011/0041268 A1 | 2/2011 | Iwahori et al. |
| 2011/0047729 A1 | 3/2011 | Iwahori |
| 2011/0083288 A1 | 4/2011 | Kressner |
| 2012/0112566 A1 | 5/2012 | Doll |
| 2012/0192366 A1 | 8/2012 | Cobabe |
| 2012/0198635 A1 | 8/2012 | Hilscher |
| 2012/0216358 A1 | 8/2012 | Kloster |
| 2014/0250612 A1 | 9/2014 | Curry et al. |
| 2014/0259469 A1 | 9/2014 | Garrigues |
| 2014/0259474 A1 | 9/2014 | Sokol et al. |
| 2015/0107035 A1 | 4/2015 | Sokol et al. |
| 2015/0297327 A1 | 10/2015 | Miller |
| 2015/0327965 A1 | 11/2015 | Garrigues |
| 2016/0151133 A1 | 6/2016 | Luettgen et al. |
| 2016/0220013 A1 | 8/2016 | Barnes et al. |
| 2016/0286948 A1 | 10/2016 | Amron |
| 2016/0286949 A1 | 10/2016 | Nguyen et al. |
| 2017/0007384 A1* | 1/2017 | Wagner .................. A46B 13/04 |
| 2018/0153298 A1 | 6/2018 | Talbert |
| 2018/0168332 A1 | 6/2018 | Wagner et al. |

FOREIGN PATENT DOCUMENTS

| | | |
|---|---|---|
| CN | 1658807 | 8/2005 |
| CN | 1886885 | 12/2006 |
| CN | 201223467 | 4/2009 |
| CN | 102026588 | 4/2011 |
| CN | 102111032 | 6/2011 |
| CN | 204971681 U | 1/2016 |
| CN | 105705113 A | 6/2016 |
| CN | 205359687 U | 7/2016 |
| DE | 243224 | 4/1910 |
| DE | 2019003 | 11/1971 |
| DE | 1766651 | 12/1981 |
| DE | 3431481 | 2/1986 |
| DE | 3512190 | 10/1986 |
| DE | 8626725 | 5/1987 |
| DE | 3736308 | 7/1989 |
| DE | 4142404 | 7/1991 |
| DE | 4003305 | 8/1991 |
| DE | 4223195 | 1/1994 |
| DE | 4223196 | 1/1994 |
| DE | 4226658 | 2/1994 |
| DE | 4226659 | 2/1994 |
| DE | 4241576 | 6/1994 |
| DE | 4309078 | 9/1994 |
| DE | 29715234 | 12/1997 |
| DE | 29919053 | 12/2000 |
| DE | 19961447 | 7/2001 |
| DE | 20319996 | 3/2004 |
| DE | 102006061381 | 6/2008 |
| EP | 0210094 | 1/1987 |
| EP | 0354352 | 2/1990 |
| EP | 0661025 | 7/1995 |
| EP | 0704180 | 4/1996 |
| EP | 0968686 | 1/2000 |
| FR | 429447 | 9/1911 |
| FR | 1171337 | 1/1959 |
| GB | 477799 | 1/1938 |
| GB | 500517 | 2/1939 |
| GB | 838564 | 6/1960 |
| GB | 899618 | 6/1962 |
| GB | 1583558 | 8/1977 |
| GB | 2175494 | 12/1986 |
| GB | 2250428 | 6/1992 |
| JP | 53029847 | 3/1978 |
| JP | 53033753 | 3/1978 |
| JP | 3222905 | 10/1991 |
| SE | 324221 | 5/1970 |
| WO | WO 91/13570 | 9/1991 |
| WO | WO 91/19437 | 12/1991 |
| WO | WO 92/10146 | 6/1992 |
| WO | WO 92/16160 | 10/1992 |
| WO | WO 93/10721 | 6/1993 |
| WO | WO 93/15628 | 8/1993 |
| WO | WO 94/04093 | 3/1994 |
| WO | WO 94/26144 | 11/1994 |
| WO | WO 95/02375 | 1/1995 |
| WO | WO 95/33419 | 12/1995 |
| WO | WO 98/47443 | 10/1998 |
| WO | WO 01/28452 | 4/2001 |
| WO | WO 01/45582 | 6/2001 |
| WO | WO 02/071970 | 9/2002 |
| WO | WO 02/071971 | 9/2002 |
| WO | WO 05/063143 | 7/2005 |
| WO | WO 2006/012974 | 2/2006 |
| WO | WO 2008/070730 | 6/2008 |
| WO | WO 2014/145890 | 9/2014 |
| WO | WO 2014/150418 | 9/2014 |
| WO | WO 2016/0124997 | 8/2016 |

OTHER PUBLICATIONS

Teledyne Water Pik "Plaque Control 3000" plaque removal instrument (Jul. 1991).

American Dentronics Incorporated "Soniplak" sonic plaque removal system (May 1993).

Teledyne Water Pik "Sensonic" Toothbrush, sales brochure (at least as early as Sep. 1994).

International Search Report and Written Opinion, PCT Application No. PCT/US2012/036092, 7 pages, Jul. 10, 2012.

International Search Report dated May 11, 2018, in PCT Application No. PCT/US2017/066604, 5 pages.

\* cited by examiner

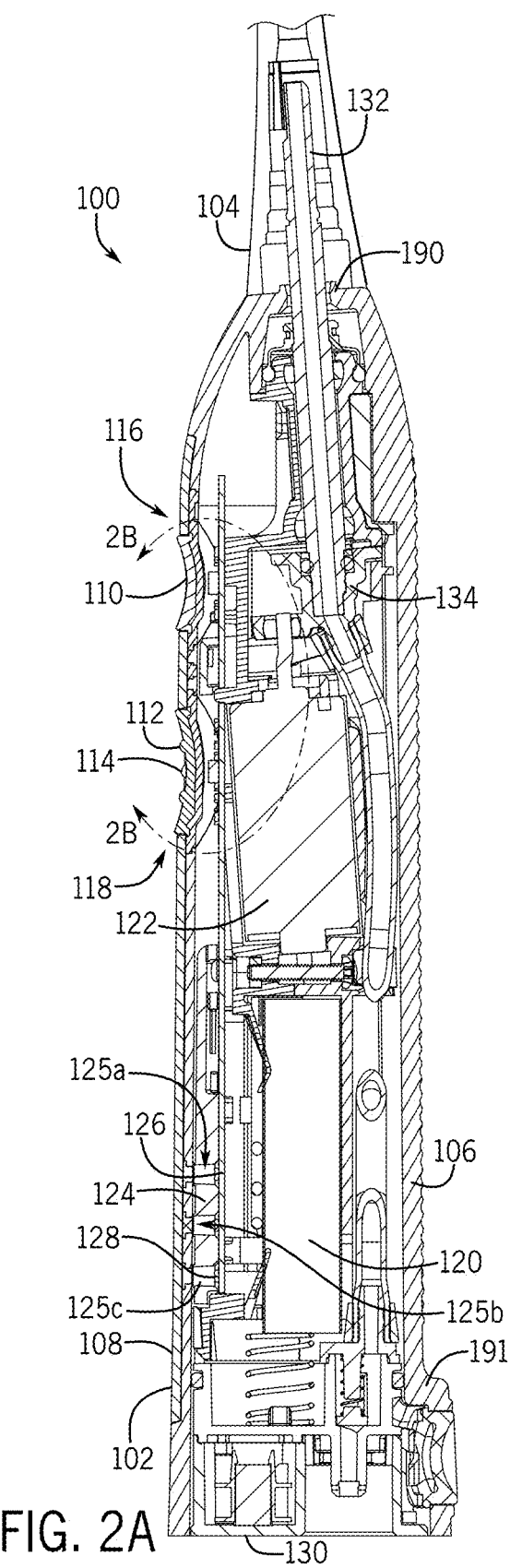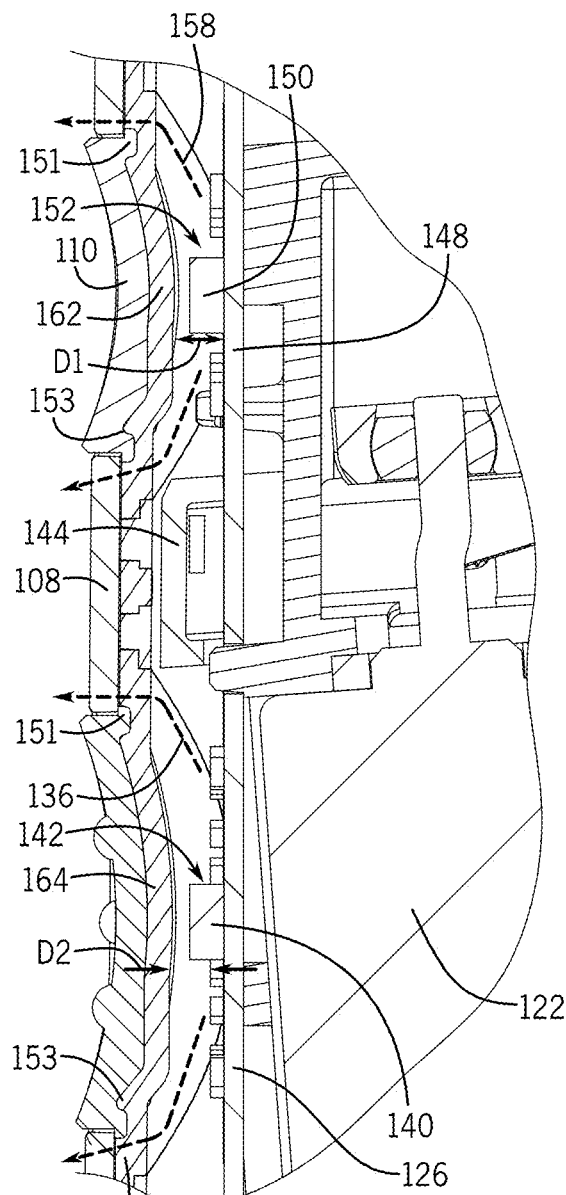
FIG. 2A
FIG. 2B

LIGHT DIFFUSER FOR ORAL CLEANSING DEVICES

CROSS REFERENCE TO RELATED APPLICATIONS

The present application is a continuation of U.S. Non-Provisional applications Ser. No. 15/843,245, filed Dec. 15, 2017, entitled "Brushing Device with Illumination Features," which claims priority to U.S. Provisional No. 62/435,053, filed Dec. 15, 2016, entitled "Motion Activated Brushing Device," both of which are incorporated by reference herein in their entirety. The application is also related to U.S. patent application Ser. No. 15/206,013, filed Jul. 8, 2016 (U.S. Pat. No. 10,449,023, issued Oct. 22, 2019, entitled "Oral Cleansing Device with Energy Conservation," which is hereby incorporated by reference herein in its entirety for any and all purposes.

TECHNICAL FIELD

The present disclosure relates to oral health products, such as toothbrushes, oral irrigators, and the like.

BACKGROUND

Oral cleansing devices, such as toothbrushes, oral irrigators, and more recently, combination brushing and irrigating devices are often part of the daily oral health routine. Daily use requires that these devices be efficient and/or rechargeable. Recent regulations regarding idle power consumption of household electronic devices require that these devices be placed in a low power or standby mode. Thus, such devices typically enter into a low-power mode when idle or when they are being recharged, for example, when they are placed in a recharging cradle. Although a low power mode may help reduce power consumption and preserve battery life, it may impact the user experience by delaying performance. For example, when a user depresses a button, such as the brush button, the brush head may not move immediately because the device must first wake from low power mode Indicators may be useful in announcing the status of a device. In some embodiments, indicators, such as lights, may signal to the user that the device is ready for use, e.g., that the device is not in low power mode. However, such indicators may increase the rate at which power is drawn from the battery.

The information included in this Background section of the specification, including any references cited herein and any description or discussion thereof, is included for technical reference purposes only and is not to be regarded subject matter by which the scope of the invention as defined in the claims is to be bound.

SUMMARY

In one embodiment, a combination toothbrush and flosser device includes a floss button, a floss switch, a floss light source, a brush button, a brush switch, a brush light source, a motion sensing module for detecting movement of the device, and a controller for accepting an electronic signal from the motion sensing module and the switches, exiting or entering a low power mode, and sending an electronic signal to the light sources. In some embodiments, the brush and floss light sources may be a plurality of light emitting diodes, wherein the plurality of light emitting diodes of the brush light source may be the same color or a different color than the plurality of light emitting diodes of the floss light source.

Also disclosed is a method of exiting a low power mode on a combination toothbrush and flosser device comprising: initiating a signal from the motion sensing module to the controller in response to movement of the device, adding one event to an event incremental counter, exiting low power mode, and sending an activation signal from the controller to the brush light source and the floss light source. The controller may be configured to re-enter low power mode if a user input, e.g., in the form of a activated switch, is not detected within a period of time, e.g., 30 seconds (referred to as a cancelled wake up), and wherein the controller may ignore signals from the motion sensing module if the controller has registered more than two cancelled wake up events. In many embodiments, the incremental counter is re-set to zero when the controller receives a user input signal from one of the floss or brush switches.

In another example, the disclosure relates to a cleansing device with illumination features. The device includes a housing including an aperture, such as a button aperture, defined therethrough, a diffuser connected to the housing and configured to span over the aperture. The device also includes a blocking member positioned over a portion of the diffuser and connected thereto and a lighting array received within the housing and at least partially aligned with the blocking member such that light emitted from the lighting array is transmitted to an exterior of the housing by traveling around the blocking member and through the diffuser.

In yet another embodiment, a dental cleaning tool is disclosed. The tool includes a housing configured to be held in a hand of a user, a lighting feature coupled to the housing, a power source in electrical communication with the lighting feature and the power source, and a motion sensor in electrical communication with the power source. In operation, the controller selectively activates the lighting feature upon detection of one or more motion events by the motion sensor.

In another embodiment, a diffuser for diffusing light is disclosed. The diffuser includes a first membrane configured to be positioned over a first light source, a second membrane coupled to the first membrane and configured to be positioned over a second light source; and a bridge coupling the first membrane to the second membrane, where the bridge extends from an edge of the first membrane to an edge of the second membrane in an indirect manner.

In yet another embodiment, an oral cleansing device is disclosed. The oral cleansing device includes a housing, a first light source connected at a first location to the housing, a second light source connected at a second location to the housing, and a diffuser positioned over the first light source and the second light source and configured to diffuse light emitted from the first light source and the second light source. The diffuser includes a first diffusing portion positioned over the first light source, a second diffusion portion positioned over the second light source, and a bridge extending between and connecting the first diffusing portion and the second diffusing portion.

In an embodiment, a diffusion assembly for oral cleansing devices is disclosed. The diffusion assembly includes a first lighting array, a second lighting array, and a diffuser positioned over the first lighting array and the second lighting array to as to diffuse light emitted from the first lighting array and the second lighting array. The diffuser includes a first diffusion portion positioned over the first lighting array, a second diffusion portion positioned over the second lighting array, and a bridge connect the first diffusing portion to the second diffusion portion, where the bridge includes one or more pleats defining a non-linear path between the first diffusing portion and the second diffusing portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 2A is a cross-section view of the cleansing device of FIG. 1A taken along line 2A-2A in FIG. 1B.

FIG. 2B is an enlarged view of the cross-section of FIG. 2A.

DETAILED DESCRIPTION

Overview

Figure 1A:
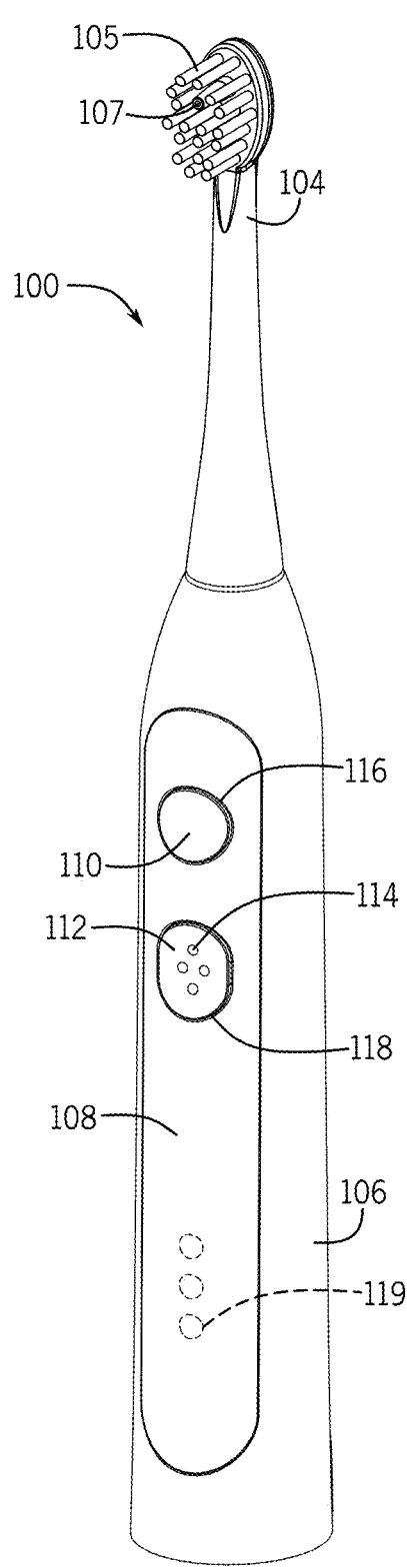
FIG. 1A is an isometric view of a cleansing device including illumination features.

The present disclosure generally relates to a brushing device that includes illumination features. The illumination features may correspond to particular functions and/or convey status information to a user. In one embodiment, the illumination features are arranged as light rings surrounding one or more function buttons. The light rings are formed by diffused light from a plurality of light sources, such as light emitting diodes (LEDs). Conventional light ring effects are formed by placing a light source a far distance from the light window, but with compact devices, such as a handheld cleaning device, in order to comfortably fit in a user's hand, the separation distance is constrained and conventional light diffuse distances are not possible. Accordingly, to create a soft and uniform light appearance, the brushing device includes a combination light diffuser and light pipe that acts to diffuse the light without requiring a large separation distance, as well as a blocked arrangement of light sources, concealing "hot spots" and creating a uniform diffused light.

In one embodiment, the light diffuser or light pipe may be a flexible membrane positioned between a switch and a button. The light diffuser flexes to allow the button to translate or otherwise move a predetermined distance to activate the switch, e.g., flex sufficiently to allow the button to compress the switch to turn the device on and off, while acting to diffuse the light from the light sources. In these instances, the light diffuser may be formed as a rubber material during an overmold process.

Additionally, in some instances the brushing device may include multiple light sources spaced apart from one another and positioned beneath an opaque surface. This configuration prevents hot spots or the specific location of the light source from being determined when viewed from the window, as well allows the use of less expensive light sources whose colors can be mixed by the diffuser to create the desired light effect, as compared to a more expensive pre-mixed light source. In other words, the light sources are blocked by an opaque member, such as a button surface, to ensure that the direct light is not emitted from the device, only the reflected and diffused light that escapes around a perimeter of the blocking member.

In some embodiments, the cleansing device may include a button window formed as contiguous translucent material designed to occupy both button openings as well as connect them. In many embodiments, an opaque structure may be positioned above one or more parts of the button window to prevent light from passing through the faceplate. The button is positioned atop the button window, such that light may pass from the interior of the housing body through the button window and through the faceplate to create a line of light outlining the button. In some embodiments, for example where the button window is substantially larger than the button, or has a significantly different shape, an opaque material (for example a tape) may be positioned between the button window and the faceplate to prevent light from passing from the interior of the housing body to the exterior. In other embodiments, the faceplate may be painted or created with opaque materials except for at or near the button openings. This embodiment may aid in directing light to escape from around the buttons. In some embodiments, an opaque coating may be removed to allow light to pass through the faceplate.

In another embodiment, the brushing device may also include a motion sensing module, which may include one or more motion sensors that may be used to activate one or more light sources and/or wake the device. The device may be configured to activate a particular light source to help a user select the desired function button. In other examples, the motion sensor may automatically activate an "on state" from a low power state based on detected movement. This helps to prevent delay from a user picking up the device and the device being ready to begin operating. The motion sensor may also be used by the device to prevent the device from waking when the device is moved, but in situations where a user would not want the device to operate (e.g., when packed in a luggage bag or during shipping of the product).

The controller is programed to integrate electrical signals received from the motion-sensing module and the switches, and signals directed to the light sources and the power source. In most embodiments, the controller may cancel a low power mode and activate one or more light sources after receiving a signal from the motion-sensing module. The controller may and maintain this state for a period of time before returning to the low power mode and de-activating the light sources. If a first user input is detected (e.g.

depression of the floss button) within this period of time (i.e., prior to returning to the low power mode and de-activating the light source), the controller may not allow the device to return to the low power until a second user input is detected, and may de-activate the light source illuminating the other button (e.g., the brush button).

The disclosed system allows the device to exit the low power mode prior to user input. In most embodiments, the low power mode may be cancelled when the motion-sensing module detects movement of the device. When movement of the device is detected, an electronic signal is sent to a controller to cancel low power mode, and also to activate an indicator that announces to the user that the device is ready to use. If no input is received from the user (for example, by activating a button after a period of time), the device will return to the low power mode to conserve power. In some embodiments, the low power mode may not be cancelled if the motion-sensing module has caused the device to cycle out of Low Power one or more times without the controller receiving a user input.

DETAILED DESCRIPTION

Figure 1B:
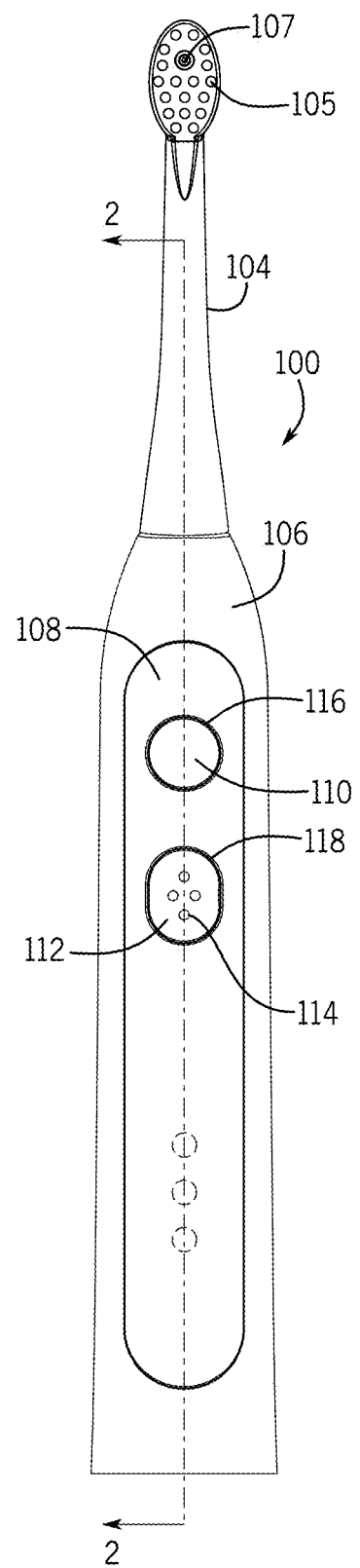
FIG. 1B is a front elevation view of the cleansing device of FIG. 1A.

Turning to the figures, a brushing or cleansing implement of the present disclosure will now be discussed in more detail. FIGS. 1A and 1B illustrate various views of an oral cleansing device 100. FIG. 2A is a cross-section view of the cleansing device taken along line 2A-2A in FIG. 1B. The device 100 includes a handle 102 having a housing 106 and a brush head 104 operably coupled thereto. The device 100 also includes one or more lighting features 116, 118, 119 that illuminate to provide feedback to a user as discussed in more detail below.

Often, the brush head 104 will be removably coupled to the handle 102 to allow a user to change the brush head 104 and allow multiple users to share the handle 102. In some instances the cleansing device 100 may include multiple functions, such as an irrigating and brushing function. In these instances, the brush head 104 may include bristles 105 and a nozzle 107. However, in other embodiments, the cleansing device 100 may include a single function and may include only bristles 105 or only a nozzle 107 or jet tip. Similarly, it should be noted that the features discussed with respect to the cleansing device 100 can be incorporated into other types of small handheld appliances and the specific discussion of any particular implementation is meant as illustrative only.

With reference to FIG. 2A, the cleansing device 100 may also include a power source, such as one or more batteries 120, a motor 122, and a drive assembly 134. One or more of the components may be connected to a chassis 148 to secure them within the housing 106. The batteries 120 provide power to the motor 122, which in turn outputs motion that the drive assembly 134 transfers to a brush shaft 132 and converts the movement into an oscillation or other type of desired motion, which in turn causes the brush head 104 to move accordingly. The cleansing device 100 may include a drive assembly 134 such as the one described in U.S. application Ser. No. 15/206,013, titled "Oral Cleansing Device with Energy Conservation," which is hereby incorporated by reference herein, for all purposes. Additionally, in instances where the device 100 may include an irrigating function, the device may be fluidly couple to a pump and reservoir that provide fluid to the nozzle 107 or optionally the pump can be housed within the handle housing 106 as shown in U.S. Pat. No. 7,147,468, entitled "Hand Held Oral Irrigator," which is hereby incorporated by reference, for all purposes, herein. In these instances, the nozzle 107 may output fluid when the irrigating function is selected.

Figure 3B:
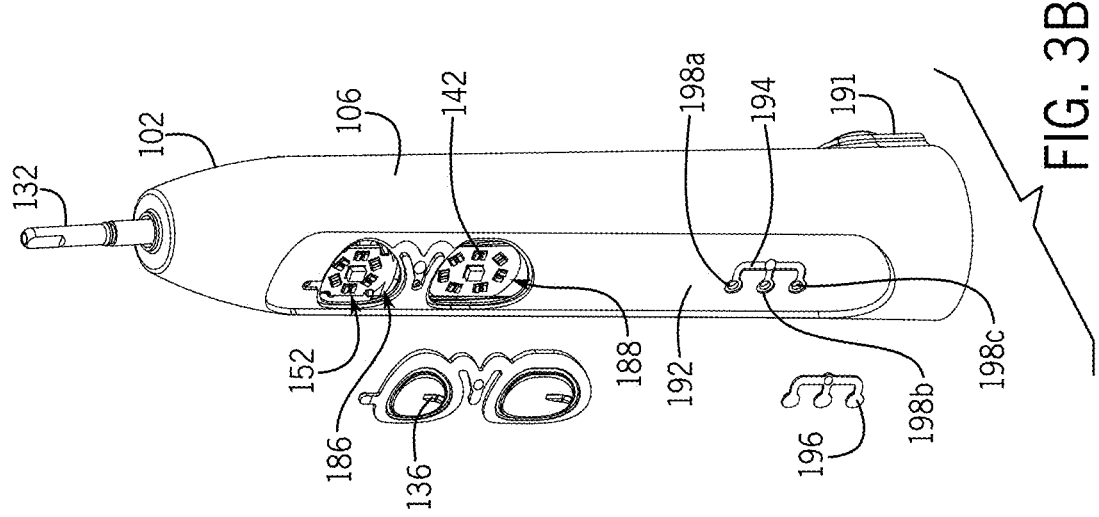
FIG. 3B is a partially exploded view of the cleansing device of FIG. 1A.
Figure 3A:
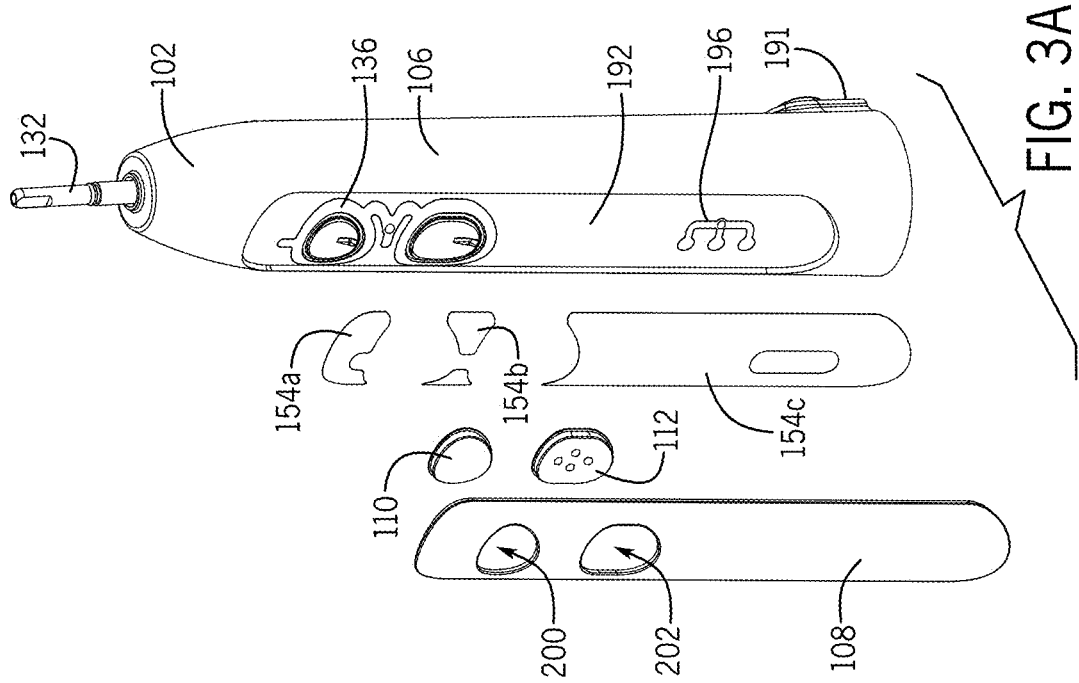
FIG. 3A is a partially exploded view of the cleansing device of FIG. 1A.

The housing 106 encloses many of the operational components of the cleansing device 100 and is shaped to be held in a user's hand. Often, the housing 106 is selected to have an aesthetically pleasing appearance, as well as a sufficiently small form factor to be held comfortably in the hand of most users. The housing 106 often may be shaped as a generally cylindrical member, but with a top portion tapering towards the terminal end. FIGS. 3A and 3B illustrate partially exploded views of the device 100. With reference to FIGS. 3A and 3B, housing 106 may also include one or more button apertures 186, 188 that receive input buttons 110, 112 and a shaft output 190 defined through the top end through which the brush shaft 132 extends. The button apertures 186, 188 may be shaped to substantially match the shape and size of the buttons 110, 112 and in one embodiment may be formed as a circular and oval shaped opening, respectively, and arranged on an upper portion of the handle housing 106.

In some instances, the housing 106 may also include one or more lens recesses 192, 194. In one example, the first lens recess 192 is formed as a faceplate recess 192 defined on front surface thereof and recessed to accommodate a faceplate 108 for the device 100. In these examples, the first lens recess 192 may extend a substantial length of the front surface of the housing and have an oval shape. The second lens recess 194 may also include one or more windows 198a, 198b, 198c defined therethrough and in optical communication with one or more light sources as discussed below.

Additionally, in embodiments where the cleansing device 100 includes irrigating features, a hose connection 191 may be defined on a sidewall or rear surface of the housing 106.

The cleansing device 100 may also include an end cap 130 connected to a bottom end of the housing 106. The end cap 130 may be used to enclose the various features of the device 100, as well as to provide connection to a fluid tube and/or electrically connect the device 100 to a charging source, such as a charger in a counter top unit. In one embodiment, the end cap 130 secures the device 100 to a charger to inductively charge the batteries 120 by electrically connecting them to a permanent power source, such as a wall outlet.

With reference to FIGS. 2A and 3A, a faceplate 108 is secured to the housing 106, such as through adhesive pads 154a, 154b, 154. The faceplate 108 is shape to match the faceplate recess 192 of the housing 106 and in one embodiment may have an elongated oval shape that may extend a substantial length of the front surface of the housing 106. The faceplate 108 may also include one or more button apertures 200, 202 defined therethrough that correspond to shapes of the input buttons 110, 112. The faceplate 108 forms a lens or window for the lighting features 116, 118. In these embodiments, the faceplate 108 may be transparent or at least partially transparent to allow light from the light sources of the lighting features 116, 118 to be transmitted therethrough. Additionally, decorative accents or the like can be applied or formed in the faceplate 108 through mold decorating or other similar processes. The configuration of the face plate 108 allows the light sources to be concealed within the housing 106 presenting a smooth overall surface without raised light features, but still allow the transmission of light to a user. In some embodiments a portion of the faceplate 108 may be painted or otherwise obscured, except in desired illumination locations, to further control emission of light from the device.

The cleansing device 100 also includes one or more input buttons 110, 112, that connect to one or more switches 140, 150 and allow a user to change or select one or more functions or characteristics of the device. In one example, the first input button 110 may be used to activate and/or modifying a brushing function (e.g., oscillate the brush head 104) and the second input button 112 may be used to activate and/or vary an irrigating function (e.g., expel fluid out of the nozzle 107). In these embodiments, the buttons 110, 112 may include distinguishing features, such as tactile elements 114 to assist a user in selecting the desired function, as well as may include different shapes and/or sizes.

As will be discussed in more detail below, one or more of the buttons 110, 112 may correspond to one or more of the lighting features 116, 118. For example, in one embodiment, the first input button 110 may be tied to the first lighting feature 116, such that the first lighting feature 116 provides feedback to a user regarding functions associated with the first input button 110. Similarly, the second input button 112 may be tied to or associated with the second lighting feature 118 such that the second lighting features 118 provides feedback or information to a user regarding functions corresponding to the second input button 112.

With reference to FIG. 2B, the input buttons 110, 112 may have a convexly curved shaped such that a central region of the outer surface of the buttons 110, 112 is recessed relative to the outer perimeter. This shape can be selected to correspond to a finger pad of a user's finger, making it easy for a user to locate and activate the input button 110, 112. Additionally, each of the input buttons 110, 112 may include a peripheral rim 151 that may be used to secure the buttons 110, 112 to the housing 106, as well as a bottom surface of each button 110, 112 may include a securing fin 153, the purpose of which is discussed below.

The lighting features 116, 118, 119, or lighting assemblies and their structures will now be discussed. The lighting features 116, 118, 119 at a general level include a light source, such as a light emitting diode (LED) or the organic light emitting diode (OLED), a lens for directing and optionally diffusing the light, one or more reflectors and light shields to ensure light is transmitted to only the desired locations. Specific implementations of the various components of the lighting features are discussed with reference to the figures below.

With reference to FIGS. 2A-3B and FIGS. 4A and 4B, the lighting features 116, 118, 119 may include a lighting array 142, 152 or light source 128, a diffuser 136 or lens 196, and a light shield 124, 144.

The lighting arrays 142, 152 may include one or more light sources 182, 184. The light sources 182, 184 may be one or more LEDs and in one embodiment, the first lighting array 154 includes six LEDs arranged in generally circular pattern around switch 150 and the second lighting array 142 includes seven LEDs arranged in a generally circular pattern around switch 140. The circular arrangement of the light sources 182, 184 provides balanced color emitted when viewed collectively. The number, positioning, and arrangement of the light sources 182, 184 depends on the desired lighting effect, e.g., for a brighter effect more light sources can be used. In some embodiments, the spacing relative to the switch 140, 150 is selected based on the size of the button, which forms a blocking element for the lights, and so the LEDs may be positioned sufficiently close to the switch to ensure that they will be oriented behind or beneath the surface of the button 110, 112.

In one embodiment, the light sources 182, 184 may be arranged in pairs and mounted directly to the circuit board 126. The light sources 182, 184 are in electrical communication with the battery 120, which provides power to the light sources 182, 184. The multiple light sources 182, 184 allow the lighting effects to have a desired color by mixing the light emitted from differently colored lights, without requiring specialized light sources that often are more expensive and/or too large for the desired space.

Further, by combining multiple lights 182, 184 in the lighting arrays 142, 154, lower powered light sources can be used, which can help to extend the length of the battery 120 and reduce power consumption for the device. Additionally, including multiple light sources helps to eliminate any hot spot effects where the origination of the light source is visible to a user as compared to a lighting feature, where the light illuminates around or in a particular arrangement (in one example a "ring" around the buttons 110, 112).

The lighting features 116, 118 may include one or more reflectors 146, 180. In one embodiment, the reflectors 146, 180 are coupled to and around the light sources 182, 184 to direct light away from the circuit board 126 and towards the face plate 108. The reflectors 146, 180 may be substantially any type of material that reflects, rather than absorbs, light and may be selected to reflect select wavelengths or all wavelengths. In one embodiment, the reflectors 146, 180 are formed as white printed pads or a white printed circuit board solder mask. In this embodiment, the reflectors 146, 180 form a reflective surface on the top surface of the circuit board 126. The reflectors 146, 180 may be defined in the same general shape as the layout or arrangement of the lighting arrays 142, 152 (e.g., as shown in FIG. 4B may be generally circular to match the circular layout of the light sources 182, 184).

Figures 4A, 4B:
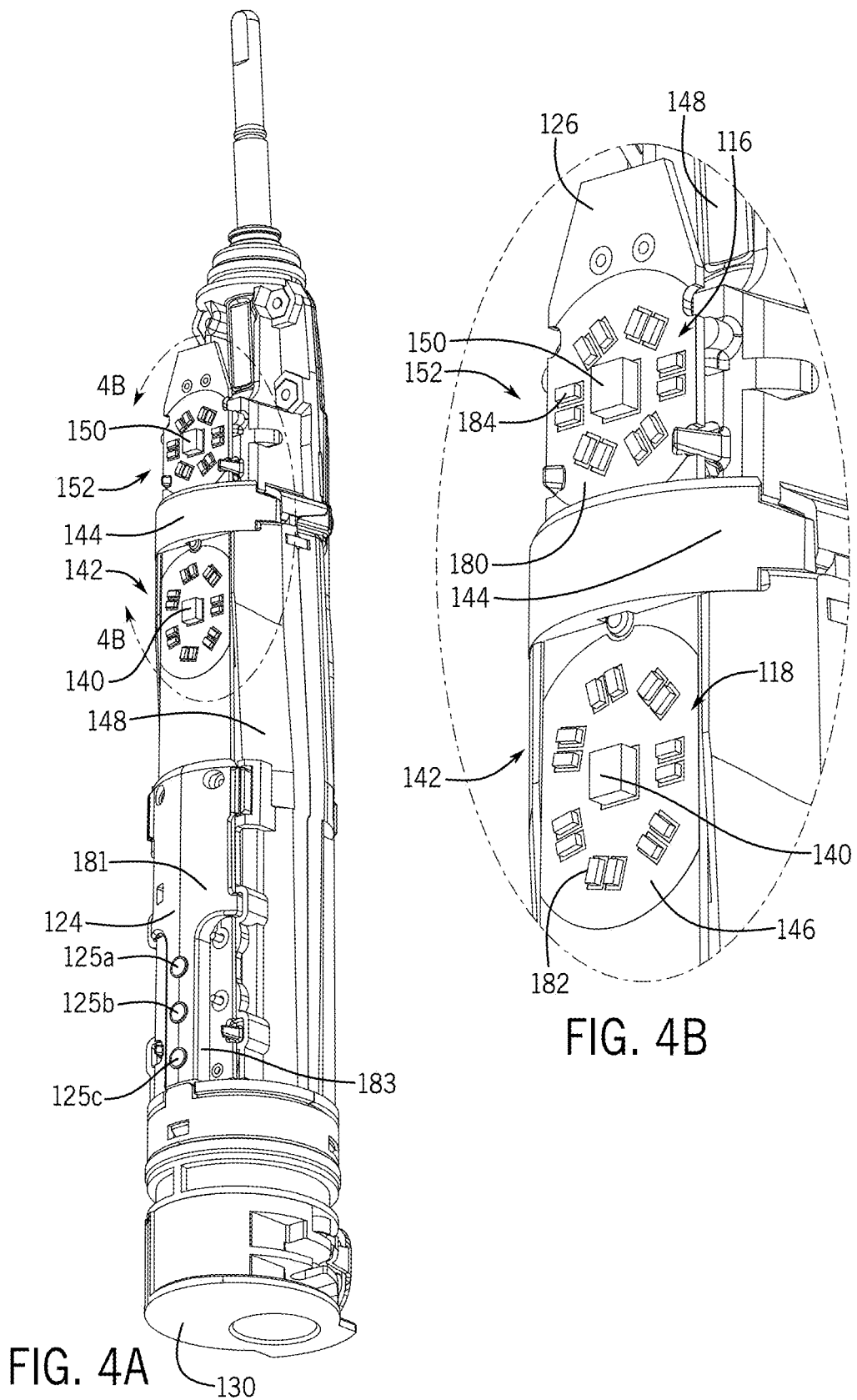
FIG. 4A is an isometric view of the cleansing device of FIG. 1A with the housing removed.
FIG. 4B is an enlarged view of the cleansing device of FIG. 4A.
Figure 5:
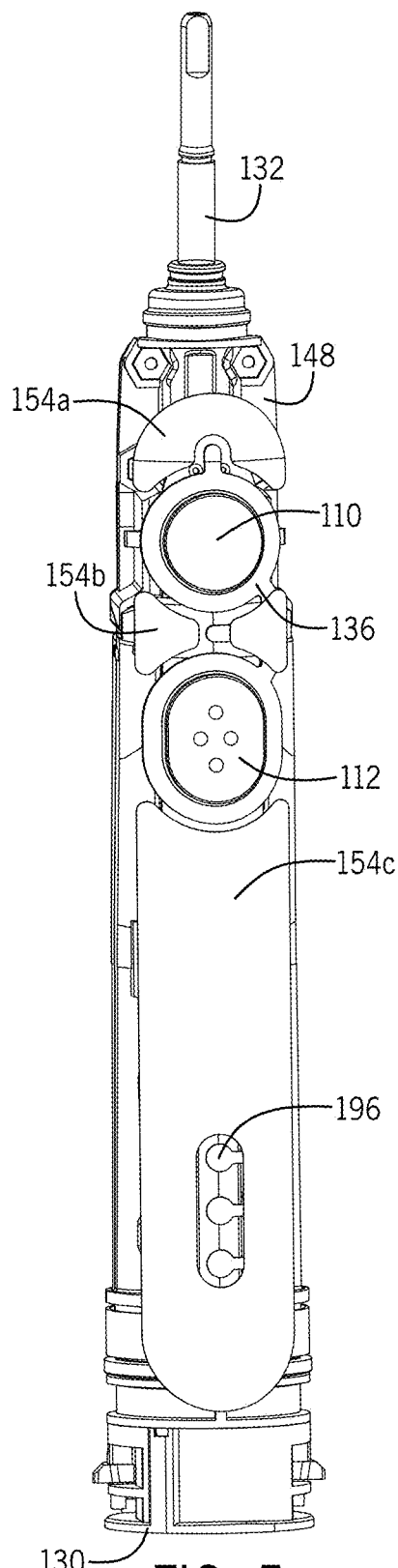
FIG. 5 is a front isometric view of the cleansing device with the housing removed to illustrate placement of adhesive and a flexible diffuser with respect to internal features.

With reference to FIGS. 4A and 4B, the light shields 124, 144 absorb or block light transmission from the lighting arrays 142, 154. This helps to ensure that the light is transmitted only in desired directions and prevent inadvertent light mixing or leakage. The top or first light shield 144 may be arranged as an arcuate member that extends over the circuit board 126 and is positioned between the top and bottom lighting arrays 142, 154. The light shield 144 or light separator may be formed as a dark colored plastic member that prevents light from the first lighting array 152 from reaching the second or bottom lighting array 142 and vice versa. In some embodiments, the light shield 144 may have a curved outer surface that matches a curvature of the housing 106.

With reference to FIGS. 2A and 4A, the second or bottom light shield 124 may be formed as a main body 181 with a post 183 extending downwards from the main body 181. The light shield 124 may include one or more securing apertures for receiving fasteners to secure it to the chassis 148 and/or circuit board 126. Additionally, the light shield 124 includes one or more light windows 125a, 125b, 125c defined as apertures therethrough. The light windows 125a, 125b, 125c may be sized and shaped to match with corresponding lights 128 such that light from the light sources 128 can be transmitted through the windows 125a, 125b, 125c, but blocked in the remaining directions. As with the light shield 144, light shield 124 may have a partially curved outer surface that at least in part matches an interior curvature of the housing 106.

With reference to FIG. 3B, the lens 196 may be shaped as a three-prong member with three circular pads on terminal ends of rungs attached to a main support. The shape of the lens 196 allows for easier manufacture and installation as compared to smaller, individual lenses 196 for individual light sources 128 (e.g., individual circular pads corresponding to each of the lights 128). However, in other embodiments, each light source 128 may include a separately configured lens, rather than the combination lens 196 shown in FIG. 3B.

Figure 6:
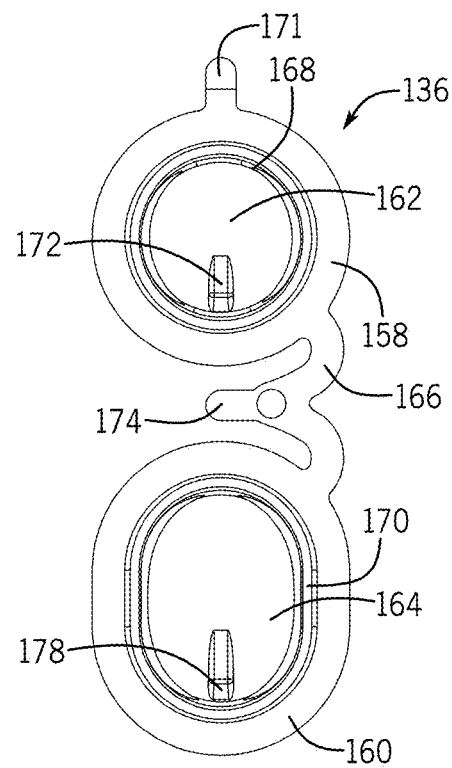
FIG. 6 is a front elevation view of a light diffuser for the cleansing device.

The lightning features 116, 118 may also include one or more diffusers. In one embodiment, flexible diffuser 136 forms the diffusing element for both lighting arrays 142, 152. FIG. 6 is a top plan view of the flexible diffuser 136. As shown in FIG. 6, the flexible diffuser 136 may include two diffusion portions coupled together by a bridge 166. The flexible diffuser 136 forms multiple purposes, function as a diffuser, light pipe, as well as provide a movable seal that translates with movement of the buttons 110, 112 and defines a joint for the buttons 110, 112.

In one embodiment, the diffuser 136 includes a first membrane 162, which may have a generally circular shape and include an annular groove 168 defined around a perimeter with a diffusing boarder 158 extending out past the groove 168 to define the periphery of the first diffusing portion. A securing recess 172 may be defined on a section of the first membrane 162 and a securing tang 171 may extend from a top wall of the diffusing boarder 158. The bridge 166 extends from a side edge of the diffusing boarder 158 and is formed as a pleated member with a securing tab 174 extending horizontal therefrom and positioned between the two diffusing sections.

The second diffusing section includes a second membrane 164 surrounded with an annular groove 170 and a diffusing boarder 160 or diffusing edge extending outwards from the groove 170 to define the periphery of the diffusing section. A securing recess 178 may also be defined in portion of the membrane 164.

The button membranes 162, 164 are flexible so as to deform and allow movement of the buttons 110, 112 as the buttons are 110, 112 are compressed or otherwise activated by a user. For example, the membranes 162, 164 may stretch as the buttons 110, 112 are pushed inwards to activate the switches 140, 150, and then spring back to their original configuration, without tearing. The button membranes and the overall material of the diffuser may be selected to prevent fluids and debris from entering into the internal cavity of the housing.

The diffusing edges or borders 158, 160 are positioned between the lighting arrays 144, 154 and the faceplate and diffuse light before it exits the faceplate 108. The shape and width of the borders 158, 160 may be selected based on the desired lighting effect.

The diffuser 136 may be formed as an overmold feature that is molded to the outer surface of the housing 106 to define a waterproof seal for the button apertures 186, 188 of the housing 106. For example, a two-shot molding process can be used. In embodiments where diffusion of the light is desired, the diffuser 136 may be a translucent color and include a color that will reflect desired light wavelengths, in one example, the diffuser 136 may be a white color to reflect all of the color spectrum. However, it should be noted that other colors may be selected based on a desired reflection. In one embodiment, the diffuser 136 is a thermoplastic elastomer that is translucent white in its natural state. One example, is EASIPRENE DE50600 in NATURAL supplied by ZHI JIN Co. Ltd. However, in other embodiments, the color of the diffuser 136 may be selected by adding a white (or other desired color) pigment to a clear thermoplastic elastomer and correct the quantity to achieve the white properties desired. The mixture ratio of the pigment and the plastic may depend on the thickness of the material, the desired diffusing characteristics, and so on. As an example, as the thickness of the material increase, the quantity of white pigment may need to be reduced in order to prevent light blockage.

Connection and operation of the cleansing device 100 and lighting features 116, 118, 119 will now be discussed. With reference to FIG. 2A, the various internal operating components of the device 100 may be installed and connected and positioned within the chassis 148. For example, the motor 122 and batteries 120 may be positioned within the chassis 148 and operably connected together. The circuit board 126 may be electrically connected to the battery 120 and then be connected to the chassis 148, such as being secured to a front surface of the chassis 148. The lighting arrays 142, 154 may be connected to the circuit board 126 so as to be in electrical communication with the battery 120.

With reference to FIGS. 4A and 4B, in one embodiment, the light arrays 142, 154 are secured to the circuit board 126 on top of the reflectors 146, 180 or optionally the reflectors may be formed around the light arrays 142, 154, but in many embodiments, the area surrounding the lighting arrays 142, 154 may be the reflective surface of the reflectors. Each switch 140, 150 may be positioned in a middle area of the lighting arrays 142, 154 such that the light sources 182, 184 flank and surround the switches 140, 150, but are spaced away from the switches 140, 150.

With reference to FIG. 2A, one or more lights 128 may be connected to a bottom end of the circuit board 126. In one embodiment, the device 100 may include three lights 128 arranged in a linear manner and used to signal battery strength for the battery 120.

Figure 7:
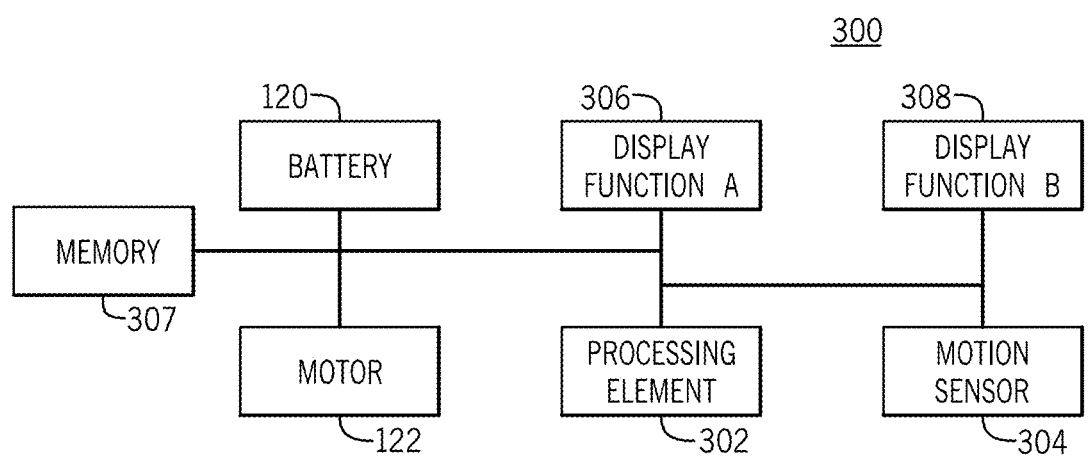
FIG. 7 is a simplified block diagram of the cleansing device of FIG. 1A.
Figure 8:
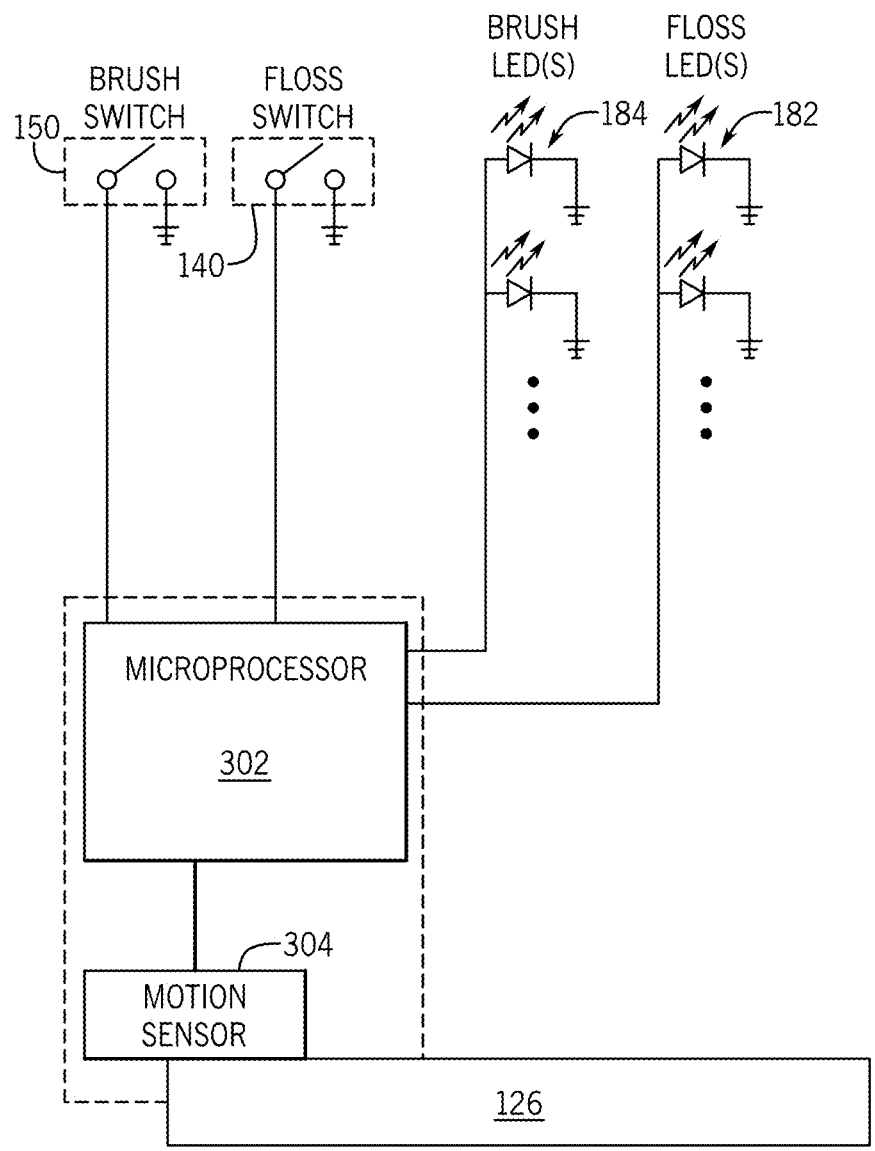
FIG. 8 is a simplified wiring diagram of the lighting features for the cleansing device of FIG. 1A.

One or more motion sensors 304 and processing elements 302 may be mounted or electrically connected to the circuit board 126 and are in electrical communication with the battery 120. A simplified diagram and exemplary writing diagram is shown in FIGS. 7 and 8, respectively. The motion sensor 304 may be an accelerometer, magnetometer, photodiode, gyroscope, or other device capable of detecting movement of the device. In some embodiments, the motion sensor 304 is positioned in a central region of the circuit board 126 to enable it to detect motion occurring at various locations of the handle 102.

The processing element 302 or controller may be a microprocessor, an application specific integrated circuit, or any other type of device capable of controlling other electronic modules in the electronic toothbrush device. In many embodiments, the processor or controller is programed to integrate electrical signals received from the motion-sensing module and the switches, and signals directed to the light sources and the power source. The controller may cancel a low power mode and activate one or more light sources after receiving a signal from the motion-sensing module. The controller may and maintain this state for a period of time before returning to the low power mode and de-activating the light sources. If a first user input is detected (e.g. depression of the floss button) within this period of time (i.e., prior to returning to the low power mode and de-activating the light source), the controller may not allow the device to return to the low power until a second user input is detected, and may de-activate the light source illuminating the other button (e.g., the brush button). Specific examples of the controller function are discussed with reference to FIG. 9.

With reference to FIGS. 2A and 4A, the circuit board 126 is mounted to the exterior surface of the chassis 148. In one embodiment, the circuit board 126 may extend over a substantial portion of the chassis 148. When the circuit board 126 is secured, the first light shield 144 may be connected to the chassis 148 and arranged between the first lighting array 152 and the second lighting array 142. In one embodiment, the light shield 144 may extend as a bracket over the circuit board 126 and be anchored at both ends to the chassis 148. The second light shield 124 may be connected to a bottom end of the circuit board 123 and positioned to cover various components. The light shield 124 is arranged such that the windows 125a, 125b, 125c align with lights 128 on the circuit board 126.

With reference to FIGS. 3A and 3B, as the device is assembled, the housing may be formed, such as through a molding process, and then certain elements may be formed or assembled to the housing. For example, the diffuser 136 is formed and secured to the housing 106, such as through a molding process. The first membrane 162 is aligned with and positioned to expand across the first button aperture 186 and similarly the second membrane 164 is positioned within and expands across the second button aperture 188. Additionally, the bridge 166 and tangs 171, 174 are positioned and formed within corresponding recess in the faceplate recess 192 of the housing 106. Additionally, the lens 196 is formed within and/or coupled to the corresponding lens recess 194 in the faceplate recess 192 of the housing 106. In one embodiment, the circular pads are positioned over window apertures 198a, 198b, 198c formed through the housing 106. It should be noted that the lens 196 and diffuser 136 act to seal the apertures defined within the housing 106 to help prevent liquids and debris from entering into the cavity of the housing 106.

With reference to FIGS. 2A-3B, the buttons 110, 112 and faceplate 108 are coupled to the housing 106. For example, adhesive pads 154a, 154b, 154c are positioned around the diffuser 136, windows 198a, 198b, 198c and other securing locations in the faceplate recess 192. The buttons 110, 112 are positioned over the first membrane 162 second membrane 164, respectively, with the button fins 153 being positioned within the corresponding securing recess 172, 178 of the diffuser 136 and the button edges being positioned in grooves 168, 170. With the buttons 110, 112 aligned and secured to the diffuser 136, the faceplate 108 is aligned with the buttons, such that the first button 110 is aligned with button aperture 200 and the second button 112 is aligned with button aperture 202. Then the faceplate 108 is position within the faceplate recess 192 and secured to the housing 106 via the adhesive 154a, 154b, 154c. Other securing methods may be use in addition to or instead of the adhesive, e.g., ultrasonic welding, fasteners, or the like. The faceplate 108 clamps the buttons 110, 112 in position such that the rims 151 of the buttons 110, 112 are positioned beneath an edge of the faceplate 108.

With reference to FIGS. 2A and 4A, the assembled chassis 148 is received within the housing 106, such as through a bottom open end of the housing 106. The brush shaft 132 extends through the brush shaft opening 190 at the top end of the housing 106 and the circuit board 126 is oriented to align with the location of the faceplate recess 192. In particular, switch 150 is positioned behind a center of the button 110 and the switch 140 is positioned behind a center of the button 112. As shown in FIG. 2B, due to the constraints of the housing 106 (e.g., that it be sufficiently small to be comfortably held in a user's hand), the circuit board 126 may be positioned a first distance D1 from the interior surface of the first membrane 162 and button 110 and positioned a second distance D2 from the interior surface of the second membrane 164 and second button 112 and/or housing 106. In some instances D1 and D2 may be equal, but in other embodiments may vary. In some embodiments, these distances may be below 0.25 inches, such as around 0.109 inches, which as discussed below is a sufficiently small distance to make dispersion of the light from the light source difficult.

The end cap 130 may then be coupled to the bottom end of the housing 106 to secure the chassis 148 and various components within the housing 106. The brush head 104 may be coupled to the brush shaft 132 and extend from the top end of the housing 106.

To use the device 100, a user grips the handle 102 around the housing 106 and lifts the device 100 off a charging platform, housing, or surface. As will be discussed below, when the user lifts the device 100, the motion sensor 304 detects the motion and the processing element 302 activates one or the lighting features 116, 118, 119. In the example of the lighting features 116 and 118, when activated, the lights 182, 184 are turned and an begin emitting light of the desired wavelength. With reference to FIG. 2B, the light wavelengths are reflected by the reflectors 146, 180 off of the top surface of the circuit board 126 and are directed outwards towards the housing 106. Additionally, the light shield 144 prevents light from light array 152 from intermixing with light from light array 142 and vice versa. For example, light array 152 may be selected to emit a first color (e.g., a green color) and light array 142 may be selected to emit a second color (e.g., blue) and the light shield 144 ensures the colors remain as desired, rather than mixed with other wavelengths.

The buttons 110, 112 may be opaque or otherwise be configured to prevent light transmission therethrough, so the light is directed through the diffusing borders 158, 160 as shown by the arrows in FIG. 2B. Due to the color of the diffuser 136, acts to mix and diffuse the wavelengths. This mixes the colors from the different lights 182, 184 in each array 142, 152, respectively to create the desired output color. The light is then directed through the faceplate 108, which may be transparent, and appears as a light ring or border around each of the buttons 110, 112. The orientation of the light sources, such as being located behind the opaque button, and the diffuser and light shields, act to emit a well diffused light where hot spots and the origin of any particular light source are obscured. This causes a high end lighting effect, in a small space where diffusion of light is difficult, but with inexpensive and easy to manufacture components.

Then, the user selects one of the functions, such as compressing the button 110, and as the user force is exerted, translates horizontally relative to a center axis of the housing 106, and moves towards the circuit board 126. This action, causes the bottom surface of the button 110 and membrane 162 to compress the switch 150, activating the desired function. Once the user force is removed, the membrane 162 returns back to its original shape, translating the button 110 in the opposite direction. Similarly, the button 112 deforms the membrane 164 when compressed to activate or deactivate the switch 140 and the membrane 164 transitions back to its original form, moving the button 112 back to its original position.

When activated, the respective function of the cleansing device 100 turns on. For example, when the brushing function is activated, the processing element activates the motor 122, which moves the brush shaft 132 and brush head 104 accordingly. Similarly, when the irrigating function is activated, the processing element activates a pump (such as in a countertop unit) to begin delivering fluid through the fluid pathway and out of the nozzle 107.

When charging or at other set times, the processing element activates the lights 128, which may correspond to a battery state. In this example, once the lights are activated, the light shield 124 directs all of the light through the windows 125a, 125b, 125c and out through the lens 196.

Motion Activated Features

Figure 9:
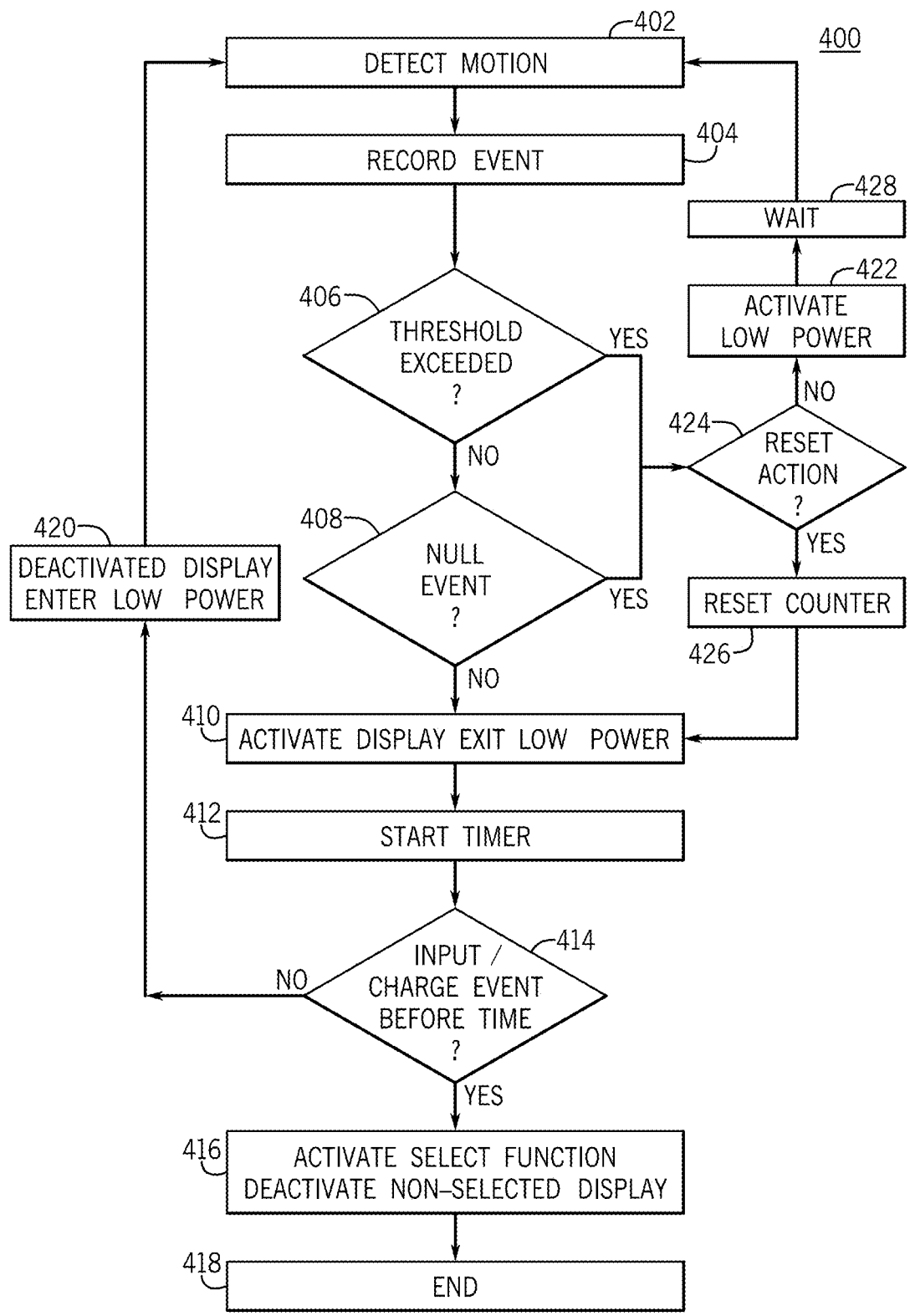
FIG. 9 is a flow chart illustrating a method for activating lighting features for the cleansing device of FIG. 1A.

As mentioned, the cleansing device 100 may also include motion activation for the lighting features 116, 118, 119. In these examples, the lighting arrays 142, 154 may be in electrical communication with a processing element 302 or microprocessor that selectively activates the lighting arrays 142, 154 and optionally lights 128 based on motion, user input, or the like. FIG. 9 illustrates an exemplary flow chart for activation of one or more of the lighting effects. With reference to FIG. 9, the method 400 may begin with operation 402 and the motion sensor 304 detects motion. For example, the motion sensor 304 may be an accelerometer that detects an acceleration force it generates a signal. A motion event may be set at a change of acceleration over a set magnitude and/or a length of time. For example, in one embodiment, a motion event is defined as a change of $\pm 0.133$ $g_0$ (Standard Gravity) and/or one that occurs for any magnitude over 0.3 seconds as detected in any one of the axes of the sensor. However, other magnitude and/or time thresholds may be used as desired, depending on the motion event detection desired.

Also, in some instances, a motion event may be an event detected by an element other than the motion sensor. For example, in some embodiments, a motion event to activate the lighting features may be one such as when the device 100 is disconnected from a charger and/or removed from a base unit. In these instances, the motion event may be an event detected by the battery or processing element.

Once a motion event is detected in operation 402, the method 400 may proceed to operation 404 and the motion event is recorded, such as in a memory component 307, counter, or other type of storage element. In some embodiments, the number of motion events occurring is stored or counted and the additional data (e.g., event time and magnitude) may not be stored, but in other embodiments, other data including event time and magnitude may be stored.

After recordation, the method 400 may proceed to operation 406, in which the processing element 302 determines whether an event threshold has been exceeded. For example, the processing element 302 may compare the number of recorded motion events against a predetermined event threshold. In one embodiment, the device 100 may have a threshold of five motion events, but any threshold may be used and may correspond to the motion event recordation thresholds (e.g., an increase in motion activation event thresholds could reduce the number of recorded events thresholds, since fewer events would be recorded when the motion activation threshold increases and vice versa).

If in operation 406, the number of recorded events has been exceeded, the method 400 may proceed to operation 424 in which the processing element determines whether a reset event has occurred. Alternatively, if in operation 406, the number of events recorded does not exceed the threshold, the method 400 may proceed to operation 408. In operation 408, the processing element may determine whether a null event has been detected. A null event is an event that may stop activation of the lighting arrays, even when a motion even occurs.

One example of a null event includes when the lighting arrays 142, 152 are already activated, such as through another function or user input, and in these instances there is no need to activate the lighting arrays. As another example, when the motor 122 is on, it is presumed that a user is in the motion of brushing and/or flossing with the handle 102 and therefore, the motion could otherwise continuously trigger the lighting arrays 142, 152 on and off, which could be annoying to a user, as well as expend battery life and the user may not easily see the lights given the brushing or flossing motions. Another example of a null event includes a predetermined time period, such as between 1-5 minutes, after a function has been selected, such as through a user input to buttons 110, 112. In this example, it may be desirable to prevent the lighting arrays from activating when a user will be completing action. In one embodiment, the lighting arrays may be prevented from activating 3 minutes after an irrigating function is selected by the user and 1 minute after a brushing function is selected by the user. Yet another example includes when the power handle receives a charge signal, such as when the battery 120 is electrically coupled to a charger. Another example includes when the detected motion is within an expected range for movement due to brushing or irrigating. In one embodiment, when the motion sensor does not detect a change more than $\pm 0.64$ $g_0$ in any of the three axes for a period of 5 seconds, the processing element may consider that a null event has occurred. In this embodiment, the motion typical of brushing and flossing may be less than or equal to $\pm 0.64$ $g_0$. However, in other examples, other motion thresholds may be used as desired.

With reference to FIG. 9, if in operation 406 the motion detection threshold is increased or in operation 408 a null event has occurred, the method may proceed to operation 424. In operation 424, the device 100 determines whether a reset action has occurred. A reset action is an action that has been programmed to reset the motion counter, examples include: the device 100 being connected to a charging device (e.g., the battery 120 receiving a charge signal) and/or when a user input is received, e.g., selection of the input buttons 110, 112. If a reset action has not be detected, the method 400 may proceed to operation 422 and a low power state may be activated and the method 400 may proceed to a wait operation 428, end, or may return to a state of detecting motion.

In some embodiments, the low power state is the motion detection state of the device 100, but in other embodiments, the low power state may include deactivation of the motion sensor 304 to help prevent battery drain. In some embodiments, the processing element 302 may simply turn the motion sensor off after certain detected events. For example, when a small number of motion events have occurred in a select time period. For example, if less than 5 motion events occur in a 25 hour period, such as might occur during shipping, storage, and the like. In these instances, the processing element may turn the motion sensor off to maximize battery life. As another example, the device 100 may include a voltage lockout where when the power in the batteries 120 is below a predetermined threshold, such as dropping below a minimum safe operating level, the processing element turns the motion sensor off to prevent further drain of the battery.

With reference again to FIG. 9, if in operation 424 a reset action has been detected, the method 400 may proceed to operation 426 and the motion counter may be reset. Resetting the counter, allows the motion activated lights to turn back on when certain events occur, even if the motion events would otherwise exceed the threshold to cause deactivation of the lights. This helps to prevent battery charge rundown due to motion events related to product shipping or travel (e.g., where numerous motion events are detected without use), but provides a reset to allow new activation of the lighting features going forward.

After operation 426 and the counter has been reset or if in operation 408 no null event occurred, then the method 400 may proceed to operation 410. In operation 410, one or more of the lighting features 116, 118, 119 are activated, e.g., the light sources are illuminated. Additionally, the device 100 may exit a low power mode and ready the components to receive activation signals from a user.

Once the lighting features 116, 118, 119 are activated, the method 400 may proceed to operation 412 and a timer may be activated. For example, in certain embodiments, the motion activated display features (e.g., the lighting features) may be activated for a select time period and optionally the motion sensor may be deactivated during this time period. In one embodiment, the lighting features may be on for 10 seconds after a motion activated event; however, other time periods can be selected.

After operation 412, the method 400 may proceed to operation 414 and the determines whether an input or charge event is received before time has expired. For example, if a user presses an input button 110, 112 or places the device 100 on a charger, the method 400 may proceed to operation 416 and the display is deactivated, e.g., certain lighting features 116, 118, 119 may be turned off. As one example, when the user selects a first input button 110, the device 100 may activate the select function (e.g., brushing or irrigating) and the lighting feature 116, 118, 119 corresponding to the select function may remain activated, but the lighting feature corresponding to the unselected function may deactivate. This allows the user to visually see via the lighting feedback which function he or she may have selected.

However, in instances when the input is a charge event that occurs before the activation time expires, then, all lighting features 116, 118, 119 may be deactivated or only the battery signal feature, which may be lighting feature 119 may remain activated. After operation 416, the method 400 may end.

If in operation 414, no input or charge event is detected before the light activation time period has expired, the method 400 may proceed to operation 420 and enter the low power mode. In the low power mode, the lighting features 116, 118, 119 may be deactivated to converse power. The method then may return to operation 402 and repeat as desired. The function may remain active until a second user input is received, at which point the device will be returned to low power mode. Alternatively, the individual functions may have set time limits to automatically return to low power mode It should be noted that each of the operations in method 400 may be performed separately from one another and may be omitted from the method flow as desired and can be performed in multiple orders and combinations.

In some examples, the lighting features may form a motion activated display or motion activated lights using one or more of the operations of method 400. As an illustrative example, when a user lifts the device 100 off of a surface the motion sensor 304 may detect the motion event and/or when the device 100 is disconnected from an electrical source, the motion activated lighting features are activated. The motion activated lights may include all of the lights on the device, e.g., battery gauge lights (e.g., light 128) and button light arrays 142, 152. After a motion activated event, the display may be on for a set period, e.g., 10 seconds, and the display will be superseded by a button press or a charge signal. The device 100 may also include a motion activated light counter to record the number of motion events and after a fifth motion event turns off the display until the counter is reset to zero (reset functions include receiving a charge signal or a user input of the function buttons). Once a motion event is detected, the display will be active (e.g., on) except when: any of the button lights are already on, such as when activated by another function; the brush motor is on, three minutes after an irrigating function button is selected or one minute after the brushing input is selected; when the device receives a charge signal, when the motion sensor does not detect a change of more than a use threshold (e.g., +0.64 $g_o$) for a select time period (e.g., 5 seconds); when the device 100 is in voltage lockout; when the device 100 is charging; or in instances where a limited number of events occur during a select time period (e.g., 5 events in a 25 hour time period).

As another example, upon sensing movement, a motion-sensing module may signal the controller to cancel the low power mode—which may be referred to as a wake-up. If the device is not in the low power mode, and has been previously woken-up, the controller may be configured to ignore a signal from the motion sensing module. In some embodiments, the movement sensing module may be a piezo electric or similar device, that may, upon experiencing motion, generate an electrical current and/or signal with little or now power. In addition, upon receiving a signal from the motion-sensing module, the controller may activate one or more indicators to signal to the user that the device is not in the low power mode and is ready for use. In some instances, the device may be moved without the user wishing to activate one or more of the devices functions. In these instances, the controller may be configured to return the device to the low power mode, e.g., if a user input is not received after a pre-set period of time. In some embodiments, this period of time may be less than about 60, 30, 25, 20, 15, 10, 5, 4, or 3 seconds. In some instances, where the motion-sensing device has signaled movement without a subsequent user input in the allotted time (e.g., a cancelled wake-up), the controller may be configured to ignore additional signals from the motion-sensing module until receipt of a user input. In most embodiments, a user input may be in the form of an activated button switch. In some embodiments the controller may be configured to ignore a signal from the motion-sensing module after 2, 3, 4, 5, 6, 7, or 8 cancelled wake-ups. Ignoring signals from the motion-sensing module after 2 or more cancelled wake ups may avoid draining of the power source when the device without the user intending to use the device, for example while traveling.

The controller aids in determining whether lights are activated and/or the low-power mode is exited. In one embodiment, when the motion sensing module, which is positioned within the handle body of the toothbrush/irrigator device, detects movement (indicating that the power handle has been moved, or picked up, by the user) an electronic signal is sent to the controller, which is also positioned within the power handle body. The controller, in turn, may send a signal to a switch allowing power to flow to one or more lights, thereby illuminating the lights. The controller may also, in response to a signal from the motion sensor, initialize an exit from a low-power mode (i.e., a "wake-up event"). The controller is also configured to return the device to low-power mode and/or de-activate the light switches if there is no user input (for example, depressing at least one button) after a pre-determined period of time. In many embodiments, the controller is able to distinguish movement that is not user-based and prevent activation of the light switches and/or cancellation of the low-power mode.

The controller may, after a specified number of cancelled wake-up events (wake-up events not followed by a timely user input), ignore additional signals from the sensing module to prevent draining the power source or battery. This function may be useful when the user is traveling with the device or the device is otherwise moved without the user having an intention of using it. Pressing either the brush button or the floss button will re-set the controller to allow subsequent signals from the sensing module to initiate a wake up event.

As described above, increasing regulations regarding idle power consumption of household electronic devices requires the base unit and the power handle electronics to be placed in in a low power use mode. Typically, a low power mode prevents automatic wake up of the power handle when lifting it off the base unit after charging is complete. By using the disclosed system and methods, the user is able to cancel the low-power mode by simply moving the device. Further, activating the motion sensing module also activates the button lights when the device is lifted from the base unit or is picked up from a surface, which indicates to the user that the brushing and flossing functions of the device are ready for activation.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An oral cleansing device comprising:
    a housing;
    a first light source connected at a first location to the housing;
    a second light source connected at a second location to the housing; and
    a diffuser positioned over the first light source and the second light source and configured to diffuse light emitted from the first light source and the second light source, the diffuser comprising:
        a first diffusing portion positioned over the first light source;
        a second diffusing portion positioned over the second light source; and
        a bridge extending between and connecting the first diffusing portion and the second diffusing portion.

2. The oral cleansing device of claim 1, wherein the bridge extends in a non-linear manner between the first diffusing portion and the second diffusing portion.

3. The oral cleansing device of claim 2, wherein the bridge extends from a first edge of the first diffusing portion to connect to a second edge of the second diffusing portion and comprises a tab portion positioned between the first edge and the second edge.

4. The oral cleansing device of claim 1, further comprising a button positioned over at least one of the first diffusing portion or the second diffusing portion, wherein the diffuser is flexible such that the diffuser flexes as the button moves relative to the housing.

5. The oral cleansing device of claim 4, wherein the housing further comprises a button aperture, wherein:
    the first light source is aligned with the button aperture;
    the diffuser spans across the button aperture; and
    the button seats at least partially within the button aperture.

6. The oral cleansing device of claim 5, wherein the diffuser further comprises a securing recessed defined therein and a portion of the button is positioned within the securing recess to allow the button to move the diffuser as the button moves relative to the housing.

7. The oral cleansing device of claim 1, wherein the first diffusing portion comprises:
    a membrane;
    a groove defined around a perimeter of the membrane; and
    a diffusing border extending outwards from the groove and defining an exterior edge of the first diffusing portion.

8. The oral cleansing device of claim 1, wherein the second diffusing portion comprises:
    a membrane;
    a groove defined around a perimeter of the membrane; and
    a diffusing border extending outwards from the groove and defining an exterior edge of the second diffusing portion.

9. The oral cleansing device of claim 1, wherein:
    the first diffusing portion comprises a first membrane;
    the second diffusing portion comprises a second membrane; and
    the bridge extends from an edge of the first membrane to an edge of the second membrane in an indirect manner.

10. The oral cleansing device of claim 9, wherein the bridge defines a first arcuate section and a second arcuate section as the bridge extends from the edge of the first membrane to the edge of the second membrane.

11. The oral cleansing device of claim 9, further comprising:
    a first groove surrounding the first membrane;
    a first diffusing border extending radially outwards from the first groove;
    a second groove surrounding the second membrane; and
    a second diffusing border extending radially outwards from the second groove.

12. The oral cleansing device of claim 11, wherein the diffuser comprises a first tang connected to the first membrane and a second tang connected to the bridge.

13. The oral cleansing device of claim 9, wherein the first membrane and the second membrane are formed of a flexible material.

14. The oral cleansing device of claim 13, wherein the diffuser is formed of a thermoplastic elastomer and is white to reflect multiple colors of a color spectrum.

15. An oral cleansing device comprising:
a housing;
a first light source coupled to the housing;
a second light source coupled to the housing and spaced part from the first light source; and
a diffuser for diffusing light comprising a first membrane configured to be positioned over the first light source, a second membrane configured to be positioned over the second light source, and a bridge coupling the first membrane to the second membrane, wherein the bridge extends from an edge of the first membrane to an edge of the second membrane in an indirect manner, wherein the first membrane is positioned between the housing and the first light source and the second light source such that the first membrane is aligned over the first light source and the second membrane is aligned over the second light source.

16. The oral cleansing device of claim 15, wherein the housing further comprises:
a first aperture aligned with the first light source; and
a second aperture aligned with the second light source, wherein the diffuser spans across the first aperture and the second aperture to seal an interior of the housing.

17. A diffusion assembly for oral cleansing devices comprising:
a first lighting array;
a second lighting array; and
a diffuser positioned over the first lighting array and the second lighting array so as to diffuse light emitted from the first lighting array and the second lighting array comprising:
a first diffusing portion positioned over the first lighting array;
a second diffusing portion positioned over the second lighting array; and
a bridge connecting the first diffusing portion to the second diffusing portion, wherein the bridge includes one or more pleats defining a non-linear path between the first diffusing portion and the second diffusion portion.

18. The diffusion assembly of claim 17, wherein the one or more pleats comprise a first arcuate section and a second arcuate section.

19. The diffusion assembly of claim 17, wherein:
the first diffusion portion comprises:
a first membrane;
a first groove extending around the first membrane; and
a first diffusion border extending radially from the first groove;
the second diffusion portion comprises:
a second membrane;
a second groove extending around the second membrane; and
a second diffusion border extending radially from the second groove.

* * * * *